United States Patent
Yeom et al.

(10) Patent No.: US 9,446,349 B2
(45) Date of Patent: Sep. 20, 2016

(54) ADSORPTIVE PERMEATION HOLLOW FIBER MEMBRANE, METHOD OF MANUFACTURING THE SAME, AND GAS ADSORPTIVE/DESORPTIVE SEPARATION SYSTEM UTILIZING THE SAME

(71) Applicant: SEPRATEK INC., Daejeon (KR)

(72) Inventors: Choong Kyun Yeom, Incheon (KR); ByungJae Park, Daejeon (KR)

(73) Assignee: SEPRATEK Inc. (KR)

( * ) Notice: Subject to any disclaimer, the term of this patent is extended or adjusted under 35 U.S.C. 154(b) by 0 days.

(21) Appl. No.: 14/734,439

(22) Filed: Jun. 9, 2015

(65) Prior Publication Data

US 2015/0273390 A1 Oct. 1, 2015

Related U.S. Application Data

(63) Continuation of application No. PCT/KR2014/002065, filed on Mar. 12, 2014.

(30) Foreign Application Priority Data

Aug. 12, 2013 (KR) .................. 10-2013-0095640

(51) Int. Cl.
*B01D 53/22* (2006.01)
*B01D 69/02* (2006.01)
(Continued)

(52) U.S. Cl.
CPC ......... *B01D 53/228* (2013.01); *B01D 53/0407* (2013.01); *B01D 53/229* (2013.01);
(Continued)

(58) Field of Classification Search
CPC ............ B01D 53/228; B01D 53/0407; B01D 53/229; B01D 69/08; B01D 71/68; B01D 69/087; B01D 2253/102; B01D 2253/108; B01D 2253/12; B01D 53/0476; B01D 63/02; B01D 69/147; B01D 2256/10; B01D 2257/504; B01D 2325/026; B01D 2325/12; B01D 71/26; Y02C 10/08; Y02C 10/10
See application file for complete search history.

(56) References Cited

U.S. PATENT DOCUMENTS 3,142,547 A * 7/1964 Skarstrom et al. ............. 95/100
3,155,468 A * 11/1964 Marsh ............................. 95/103
(Continued)

FOREIGN PATENT DOCUMENTS

JP 3134524 U 8/2007
JP 2008-93503 A 4/2008
(Continued)

OTHER PUBLICATIONS

"powder" American Heritage Dictionary of the English Language, Fifth Edition. Copyright 2011 by Houghton Mifflin Harcourt Publishing Company, 1 page, http://www.thefreedictionary.com/powder.*

(Continued)

*Primary Examiner* — Jason M Greene
*Assistant Examiner* — Anthony Shumate
(74) *Attorney, Agent, or Firm* — Park & Associates IP Law, P. C.

(57) ABSTRACT

Disclosed are an adsorptive permeation hollow fiber membrane formed by uniformly dispersing an adsorbent capable of selectively adsorbing only a specific gas in mixed gas components inside a porous hollow fiber membrane having a sponge structure capable of non-selectively permeating a mixed gas in a powder or crystalline powder form, a method of manufacturing the same, and a gas adsorptive/desorptive separation system utilizing the same.

8 Claims, 18 Drawing Sheets

(51) Int. Cl.
  *B01D 69/08* (2006.01)
  *B01D 69/14* (2006.01)
  *B01D 53/04* (2006.01)
  *B01D 71/68* (2006.01)
  *B01D 71/26* (2006.01)
  *B01D 53/047* (2006.01)

(52) U.S. Cl.
  CPC ............ *B01D 69/02* (2013.01); *B01D 69/08* (2013.01); *B01D 69/087* (2013.01); *B01D 69/147* (2013.01); *B01D 71/26* (2013.01); *B01D 71/68* (2013.01); B01D 53/0476 (2013.01); B01D 2253/102 (2013.01); B01D 2253/108 (2013.01); B01D 2256/10 (2013.01); B01D 2257/504 (2013.01); B01D 2325/026 (2013.01); B01D 2325/12 (2013.01); Y02C 10/08 (2013.01); Y02C 10/10 (2013.01)

(56) References Cited

U.S. PATENT DOCUMENTS

| | | | | |
|---|---|---|---|---|
| 3,164,454 A * | 1/1965 | Milton | ............................ | 95/130 |
| 3,221,476 A * | 12/1965 | Meyer | ................................ | 95/97 |
| 3,313,091 A * | 4/1967 | Berlin | ............................ | 95/105 |
| 3,594,983 A * | 7/1971 | Yearout | ............................ | 95/97 |
| 3,944,400 A * | 3/1976 | Bird | ................................ | 95/11 |
| 4,013,429 A * | 3/1977 | Sircar et al. | ..................... | 95/101 |
| 4,168,149 A * | 9/1979 | Armond et al. | ................... | 95/21 |
| 4,203,958 A * | 5/1980 | Snarski | ........................ | 423/351 |
| 4,326,858 A * | 4/1982 | Benkmann | ........................ | 95/98 |
| 4,468,238 A * | 8/1984 | Matsui et al. | ................... | 95/102 |
| 4,477,265 A * | 10/1984 | Kumar et al. | ..................... | 95/26 |
| 4,482,362 A * | 11/1984 | Yamazaki et al. | .............. | 95/119 |
| 4,715,867 A * | 12/1987 | Vo | ................................... | 95/101 |
| 4,915,711 A * | 4/1990 | Kumar | ............................ | 95/101 |
| 5,194,158 A * | 3/1993 | Matson | ............. | B01D 19/0005 210/195.2 |
| 5,207,806 A | 5/1993 | Lagree et al. | | |
| 5,417,743 A * | 5/1995 | Dauber | ................. | B01D 46/10 360/99.15 |
| 5,964,221 A * | 10/1999 | McKenna | .......... | B01D 53/0415 128/201.27 |
| 6,352,577 B1 * | 3/2002 | Martin | .................... | B01B 1/005 96/108 |
| 7,138,006 B2 * | 11/2006 | Miller | ................. | B01D 53/228 55/524 |
| 7,341,618 B2 * | 3/2008 | Bayer | .................... | B01D 39/16 502/402 |
| 7,422,724 B1 * | 9/2008 | Manginell | ............ | B01J 20/3483 422/420 |
| 7,618,477 B2 * | 11/2009 | Pullumbi et al. | ................. | 95/96 |
| 7,655,070 B1 * | 2/2010 | Dallas et al. | .................... | 95/154 |
| 8,133,308 B2 * | 3/2012 | Lively et al. | .................... | 96/154 |
| 8,343,264 B2 * | 1/2013 | Dallas | .................... | B01D 39/04 55/486 |
| 8,383,026 B1 * | 2/2013 | Luebke | .................... | D01D 5/06 264/172.16 |
| 2003/0033929 A1 * | 2/2003 | Pinnau | ................. | B01D 53/228 95/45 |
| 2003/0054150 A1 * | 3/2003 | Evans | .................... | B29B 15/105 428/297.4 |
| 2008/0282892 A1 * | 11/2008 | Deckman et al. | .............. | 96/140 |
| 2010/0095846 A1 * | 4/2010 | Skirius | ............... | B01D 39/1623 95/285 |
| 2012/0145008 A1 * | 6/2012 | Chau | .......................... | C08J 3/22 96/153 |
| 2012/0247330 A1 * | 10/2012 | Chang et al. | ...................... | 95/92 |
| 2013/0276634 A1 * | 10/2013 | McKenna | ............ | B01D 53/047 96/153 |
| 2014/0096682 A1 * | 4/2014 | Aichele | .................... | C08J 3/005 95/168 |
| 2014/0272207 A1 * | 9/2014 | McKenna | ............ | B01J 20/261 428/34 |

FOREIGN PATENT DOCUMENTS

| | | |
|---|---|---|
| KR | 1999-0062850 A | 7/1999 |
| KR | 10-2004-0039669 A | 5/2004 |
| KR | 10-2005-0020820 A | 3/2005 |
| KR | 10-2009-0073117 A | 7/2009 |
| KR | 10-2012-0076040 A | 7/2012 |
| WO | 2009003171 A1 | 12/2008 |

OTHER PUBLICATIONS

WIPO, International Search Report (PCT/KR2014/002065), Jul. 16, 2014.

* cited by examiner

ADSORPTIVE PERMEATION HOLLOW FIBER MEMBRANE, METHOD OF MANUFACTURING THE SAME, AND GAS ADSORPTIVE/DESORPTIVE SEPARATION SYSTEM UTILIZING THE SAME

REFERENCE TO RELATED APPLICATIONS

This is a continuation of pending International Patent Application PCT/KR2014/002065 filed on Mar. 12, 2014, which designates the United States and claims priority of Korean Patent Application No. 10-2013-0095640 filed on Aug. 12, 2013, the entire contents of which are incorporated herein by reference.

FIELD OF THE INVENTION

The present invention relates to an adsorptive permeation hollow fiber membrane, in more detail, it relates to an adsorptive permeation hollow fiber membrane capable of effectively separating carbon dioxide and an acid gas contained in exhaust gases discharged from power plants, factories, chemical processes and the like or a general gas mixture and the like, a method of manufacturing the same, and a gas adsorptive/desorptive separation system utilizing the same.

BACKGROUND OF THE INVENTION

As the separation and recovery method of carbon dioxide, an absorption method, an adsorption method, a membrane separation method and the like are known.

Each of these methods has characteristics, advantages and disadvantages and thus is selected in accordance with the conditions in actual use. The absorption method is a method to separate carbon dioxide by dissolving an absorbent such as an amine alkali metal salt in water and is currently applied to thermal power plants, steel mills and the like in many cases. However, the absorption method has a number of problems such as excessive energy consumption for regeneration of the absorbing liquid, the overflow and channeling phenomenon of absorbing liquid in the absorption tower, a small gas-liquid contact area, and corrosion of the absorbing liquid. The adsorption method is a method to adsorb the gas to be separated while allowing the mixed gas to pass through the bed filled with an adsorbent such as zeolite and has been applied to some gas treatment processes along with the study on various adsorbents, but the adsorption method has disadvantages that the use of a powdery adsorbent is limited due to the scattering problem and thus a granular adsorbent is used to have a decrease in contact efficiency, the flow velocity of the mixed gas in the bed is fast in the center and slow on the periphery and thus the adsorption mainly proceeds in the center to have a limited adsorption amount as compared to the amount of the adsorbent used, and it takes a long time to regenerate the adsorbent. The membrane separation method is a separation method that utilizes a hollow fiber membrane capable of selectively permeating a portion of the mixed gas and has disadvantages that it takes an excessively long time and excessive energy is consumed to separate the gas since the membrane permeation speed of the gas is slow and a high pressure is required to be applied.

SUMMARY OF THE INVENTION

The present invention has been made to solve the problems of the conventional gas separation described above, and the first object to be achieved by the present invention is to allow the contact between the adsorbent and the gas to be adsorbed to take place uniformly and quickly in all directions and thus to provide an adsorptive permeation hollow fiber membrane capable of maximizing the contact efficiency between the adsorbent and the gas to be adsorbed.

The second object to be achieved by the present invention is to provide an adsorptive permeation hollow fiber membrane capable of efficiently adsorbing the gas without scattering of the adsorbent and a use time-dependent increase in packing density of the adsorbent by not using the granular adsorbent that is used in the bed adsorption method of a conventional adsorption method but dispersing a powdery crystalline adsorbent inside the hollow fiber membrane.

The third object to be achieved by the present invention is to provide an adsorptive permeation hollow fiber membrane capable of significantly decreasing the regeneration time of the saturated adsorbent than the bed adsorption method of a conventional adsorption method.

The fourth object to be achieved by the present invention is to provide an adsorptive permeation hollow fiber membrane capable of significantly decreasing the energy consumption in the adsorption process and the regeneration process than the bed adsorption method of a conventional adsorption method.

The fifth object to be achieved by the present invention is to provide an adsorptive permeation hollow fiber membrane capable of easily diversifying the size of the gas adsorptive/desorptive separation system from those for small separation to those for bulk separation.

To solve the above-mentioned problem, according to an aspect of the present invention, there is provided an adsorptive permeation hollow fiber membrane formed by uniformly dispersing an adsorbent capable of selectively adsorbing only a specific gas in mixed gas components inside a sponge-structured porous hollow fiber membrane capable of non-selectively permeating a mixed gas in a powder or crystalline powder form.

Preferably, the adsorbent is one or two or more fillers selected from zeolites, activated carbon or silica.

Preferably, the adsorbent is a powder having a size of from 1 μm to 5 μm.

Preferably, a material of the porous hollow fiber membrane is one or two or more polymers selected from polypropylene, polyimides, polyphenylene sulfide, polysulfones, polyvinylidene fluoride (PVDF), celluloses, or polyvinyl chloride (PVC).

According to another aspect of the present invention, there is provided a method of manufacturing an adsorptive permeation hollow fiber membrane comprising: a step of mixing a polymer, a diluent or a solvent, and an adsorbent to produce an adsorbent-dispersed dope solution; a step of spinning the adsorbent-dispersed dope solution to form a hollow fiber; and a step of conducting phase separation and solidification of the hollow fiber so as to form a porous hollow fiber membrane which permeates the entire mixed gas intended to be separated.

Preferably, the adsorbent is contained in the dope solution at a proportion of from 15% by weight to 60% by weight.

According to further aspect of the present invention, there is provided a gas adsorptive/desorptive separation system comprising: a first hollow fiber membrane module including a great number of the adsorptive permeation hollow fiber membranes inside a housing as an assembly and the housing provided with a hollow fiber internal communication port through which gas is injected into the inside of the adsorptive permeation hollow fiber membrane and a hollow fiber external communication port through which gas permeated through the adsorptive permeation hollow fiber membrane is discharged; a second hollow fiber membrane module including a great number of the adsorptive permeation hollow fiber membranes inside a housing as an assembly and the housing provided with a hollow fiber internal communication port through which gas is injected into the inside of the adsorptive permeation hollow fiber membrane and a hollow fiber external communication port through which gas permeated through the adsorptive permeation hollow fiber membrane is discharged; a vacuum pump; and a gas flow path switching means to connect the hollow fiber internal communication port of the first hollow fiber membrane module to a mixed gas supply device and the hollow fiber external communication port of the first hollow fiber membrane module to the outside and thus to connect the hollow fiber internal communication port and the hollow fiber external communication port of the second hollow fiber membrane module to the vacuum pump when an adsorption process proceeds in the first hollow fiber membrane module so that an adsorbent regeneration process proceeds in the second hollow fiber membrane module, and to connect the hollow fiber internal communication port and the hollow fiber external communication port of the first hollow fiber membrane module to the vacuum pump and thus to connect the hollow fiber internal communication port of the second hollow fiber membrane module to the mixed gas supply device and the hollow fiber external communication port of the second hollow fiber membrane module to the outside when an adsorbent regeneration process proceeds in the first hollow fiber membrane module so that an adsorption process proceeds in the second hollow fiber membrane module.

According to further another aspect of the present invention, there is provided a gas adsorptive/desorptive separation system comprising: a first hollow fiber membrane module including a great number of the adsorptive permeation hollow fiber membranes inside a housing as an assembly and the housing provided with a hollow fiber external communication port through which gas is injected into the outside of the adsorptive permeation hollow fiber membrane and a hollow fiber internal communication port through which gas permeated through the adsorptive permeation hollow fiber membrane is discharged; a second hollow fiber membrane module including a great number of the adsorptive permeation hollow fiber membranes inside a housing as an assembly and the housing provided with a hollow fiber external communication port through which gas is injected into the outside of the adsorptive permeation hollow fiber membrane and a hollow fiber internal communication port through which gas permeated through the adsorptive permeation hollow fiber membrane is discharged; a vacuum pump; and a gas flow path switching means to connect the hollow fiber external communication port of the first hollow fiber membrane module to a mixed gas supply device and the hollow fiber internal communication port of the first hollow fiber membrane module to the outside and thus to connect the hollow fiber internal communication port and the hollow fiber external communication port of the second hollow fiber membrane module to the vacuum pump when an adsorption process proceeds in the first hollow fiber membrane module so that an adsorbent regeneration process proceeds in the second hollow fiber membrane module, and to connect the hollow fiber internal communication port and the hollow fiber external communication port of the first hollow fiber membrane module to the vacuum pump and thus to connect the hollow fiber external communication port of the second hollow fiber membrane module to the mixed gas supply device and the hollow fiber internal communication port of the second hollow fiber membrane module to the outside when an adsorbent regeneration process proceeds in the first hollow fiber membrane module so that an adsorption process proceeds in the second hollow fiber membrane module.

According to the present invention having the configuration described above, the contact between the adsorbent and the gas to be adsorbed takes place uniformly and quickly in all directions and thus the contact efficiency between the adsorbent and the gas to be adsorbed is excellent, and it is also possible to uniformly apply the vacuum in all directions at the time of desorbing the adsorbed gas for regeneration of the adsorbent and thus quick regeneration can be achieved. In addition, the adsorbent can be dispersed in a powder form and thus it is possible to further increase the adsorption area as compared to the bed adsorption method of a conventional adsorption method using a granular adsorbent although the amounts of adsorbents are the same. Consequently, it is possible to adsorb the same amount or a greater amount of gas while significantly decreasing the amount of the adsorbent used. In addition, unlike the bed adsorption method of a conventional adsorption method, the adsorption between the adsorbent and the gas to be adsorbed and the desorption between the adsorbent and the adsorbed gas possibly proceed at a low pressure in the adsorption process and the regeneration process, and thus it is possible to significantly decrease the energy consumption. In addition, it is possible to easily change the adsorption/desorption capacity by increasing the number of hollow fiber membrane modules or the number of hollow fiber membranes in the module, and thus there is an advantage that the size of the gas adsorptive/desorptive separation system can be easily diversified from those for small separation to those for bulk separation.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, the adsorptive permeation hollow fiber membrane, the method of manufacturing the same, and the gas adsorptive/desorptive separation system utilizing the same according to the present invention will be explained in detail with reference to the accompanying drawings.

In the accompanying drawings and the following description, a case in which carbon dioxide is adsorbed to the adsorptive permeation hollow fiber membrane and separated from a mixed gas of carbon dioxide and nitrogen ($CO_2+N_2$) is explained by way of example, but the mixed gas that is separable by the adsorptive permeation hollow fiber membrane according to the present invention is not limited and only the adsorbent is changed depending on the kind of the gas to be adsorbed.

Figure 1:
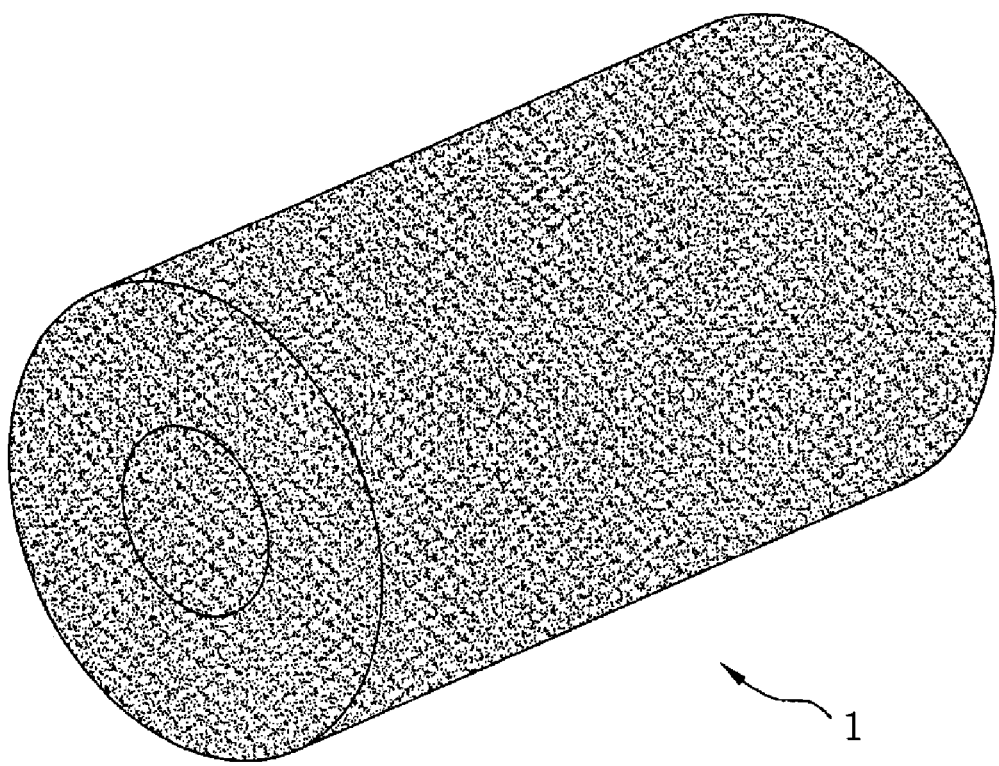
FIG. 1 is an enlarged perspective view of a porous hollow fiber membrane illustrated after removing the adsorbent from the adsorptive permeation hollow fiber membrane according to the present invention.

As illustrated in FIG. 1, the adsorptive permeation hollow fiber membrane according to the present invention utilizes a sponge-structured highly porous hollow fiber membrane. The porous hollow fiber membrane of the present invention exhibits permeability with respect to all the components (constituent gases) of the mixed gas to be introduced. In other words, according to the present invention, a porous hollow fiber membrane structure which has great pores and a great porosity so as to be able to non-selectively permeate a mixed gas is formed and thus the pressure drop when the mixed gas passes through the hollow fiber membrane is minimized. This point distinguishes the hollow fiber membrane of the present invention from the existing hollow fiber membrane for gas separation.

Figure 2:
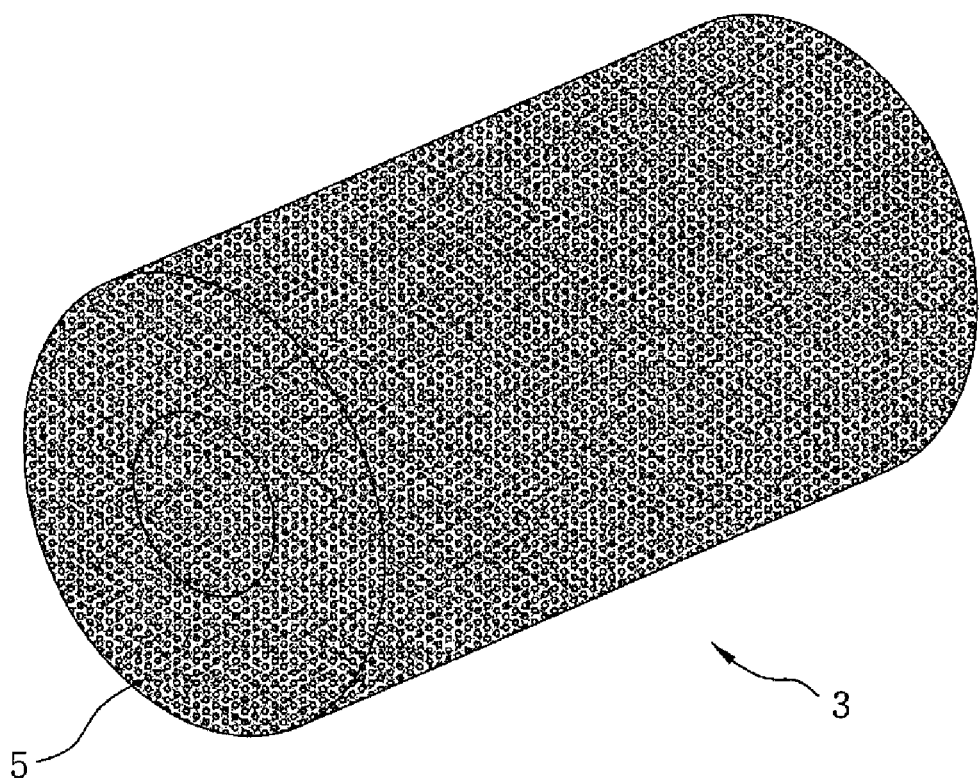
FIG. 2 is an enlarged perspective view of an adsorptive permeation hollow fiber membrane illustrated to conceptually show the adsorbent dispersed in the adsorptive permeation hollow fiber membrane according to the present invention.
Figure 17:
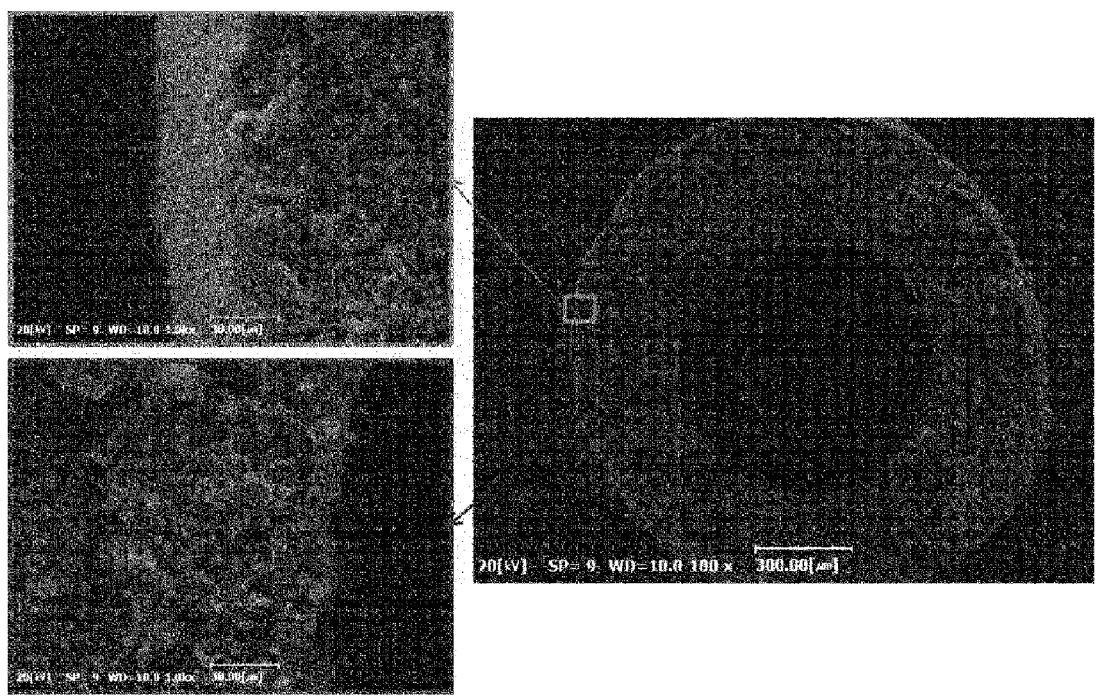
FIG. 17 is a scanning electron microscope (SEM) image for the cross section of the adsorptive permeation hollow fiber membrane according to Example of the present invention.
Figure 18:
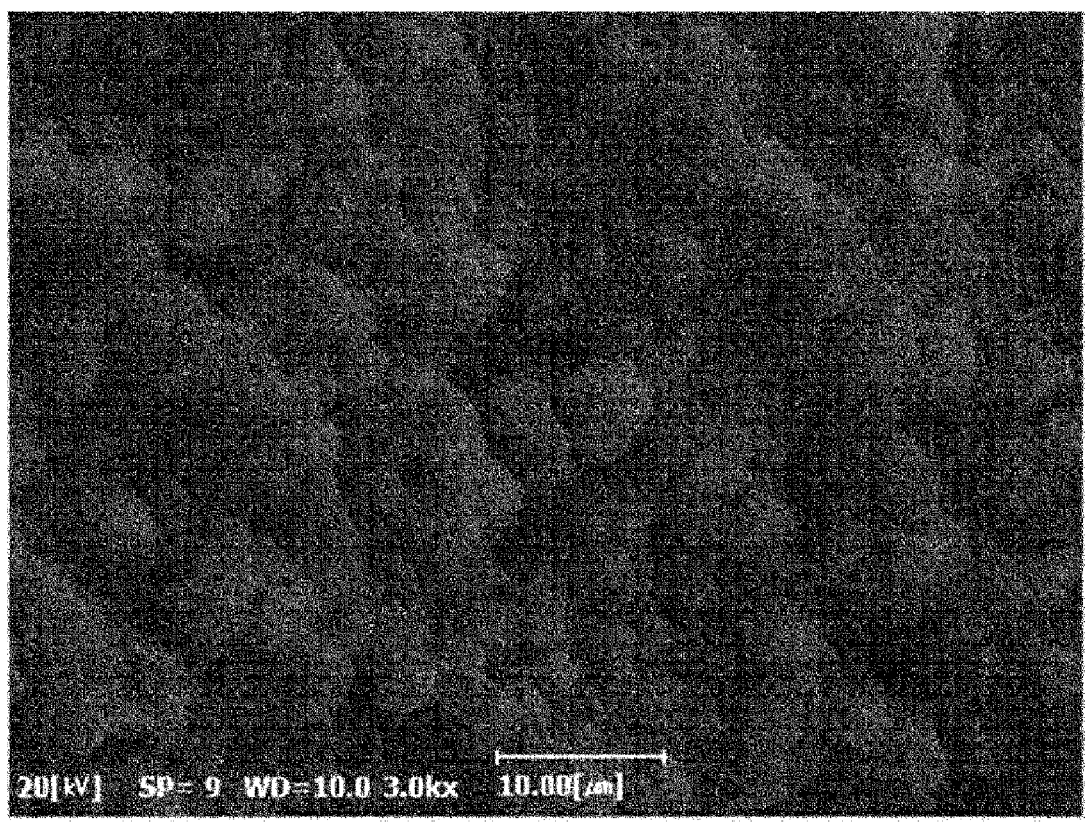
FIG. 18 is a scanning electron microscope (SEM) image for the outer surface of the adsorptive permeation hollow fiber membrane according to Example of the present invention.

As illustrated in FIG. 2, the present invention is characterized in that an adsorbent 5 capable of selectively adsorbing only a specific gas (referred to as the gas to be adsorbed in the present invention) in the mixed gas components is uniformly dispersed inside the sponge-structured porous hollow fiber membrane capable of non-selectively permeating the mixed gas in a powder or crystalline powder form. In FIG. 2, the adsorptive permeation hollow fiber membrane according to the present invention is illustrated as an enlarged view and the adsorbent 5 is regularly illustrated as a granule for convenience of explanation, but, as illustrated in FIGS. 17 and 18, the crystalline adsorbent 5 dispersed inside the hollow fiber membrane of the present invention is a powder having a size in a range of from 1 μm to 5 μm and uniformly dispersed. It means that the adsorbent 5 is powdered to have a crystal unit and dispersed in consideration that a general crystal size of the crystalline adsorbent 5 is from 1 μm to 5 μm. In the present invention, it is referred to as a crystalline powder. The contact area of the adsorbent with a specific gas is theoretically and practically the greatest when the crystalline adsorbent 5 is dispersed in a crystal unit. It is also possible to use a powdery adsorbent formed by integrally combining two or more crystals so as to have a size of from 5 μm to 100 μm if necessary. According to the present invention, it is possible to further increase the adsorption area as compared to the bed adsorption method of a conventional adsorption method using a granular adsorbent although the amount of adsorbent is the same. Hence, it is possible to adsorb the same amount or a greater amount of gas while significantly decreasing the amount of the adsorbent used.

In a case in which the gas to be adsorbed is carbon dioxide, the adsorbent can be selected from zeolites, activated carbon, or silica, but it is not necessarily limited thereto.

The material of the porous hollow fiber membrane can be selected from one or two or more polymers selected from polypropylene, polyimides, polyphenylene sulfide, polysulfones, polyvinylidene fluoride (PVDF), celluloses, or polyvinyl chloride (PVC), but it is not necessarily limited thereto.

Hereinafter, the action of the present invention having the configuration as described above will be explained.

Figure 4:
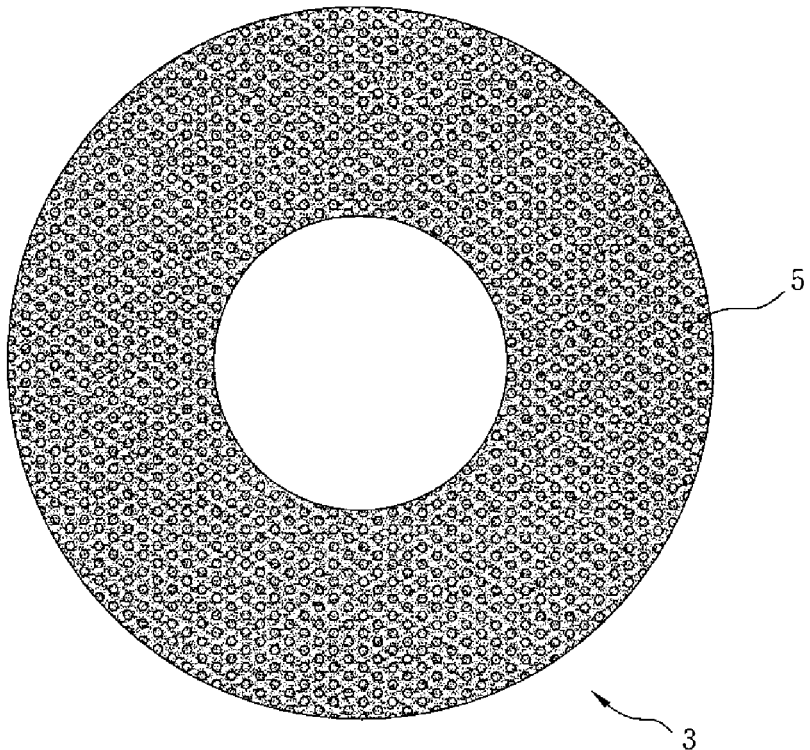
FIG. 4 is a transverse sectional view of the adsorptive permeation hollow fiber membrane illustrated in FIG. 3 after being enlarged and cut.

FIG. 4 illustrates a cross sectional view of the adsorptive permeation hollow fiber membrane according to the present invention in which pores having a uniform average density and a uniform average size are formed in the thickness direction or spinning direction of the adsorptive permeation hollow fiber membrane 3 and an adsorbent 5 having a uniform average density and a uniform average size is dispersed. As illustrated in FIG. 4, the powdery adsorbent 5 is held by the material of the hollow fiber membrane while being dispersed, and thus it is not concerned that the adsorbent 5 is concentrated or scattered.

Figure 5:
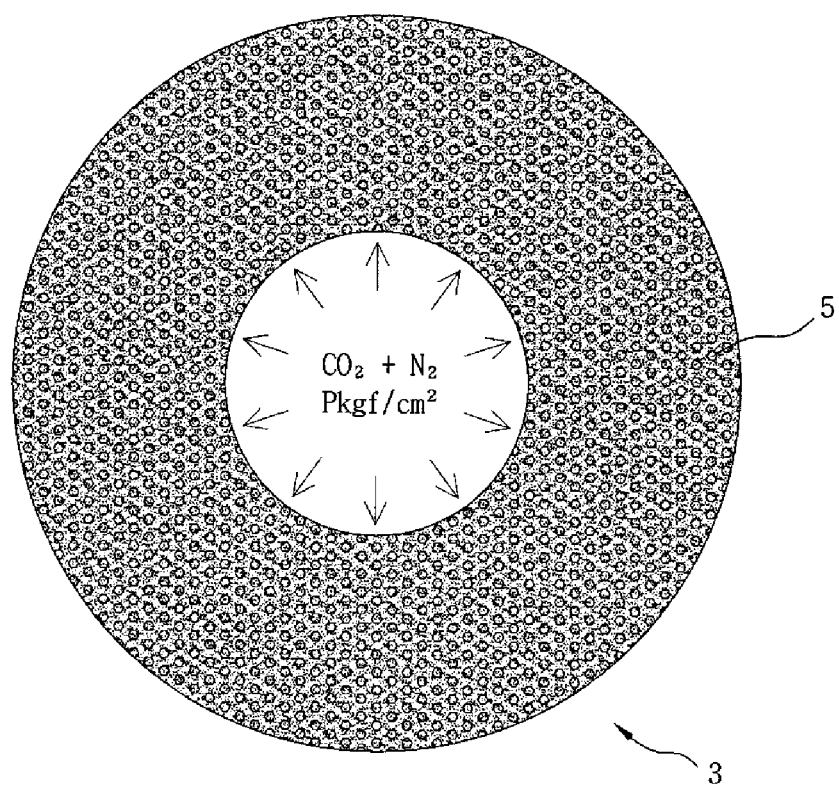
FIGS. 5 to 7 are adsorption process diagrams illustrating the adsorption process of a specific gas in the case of introducing a mixed gas into the inside of the adsorptive permeation hollow fiber membrane according to the present invention.
Figure 6:
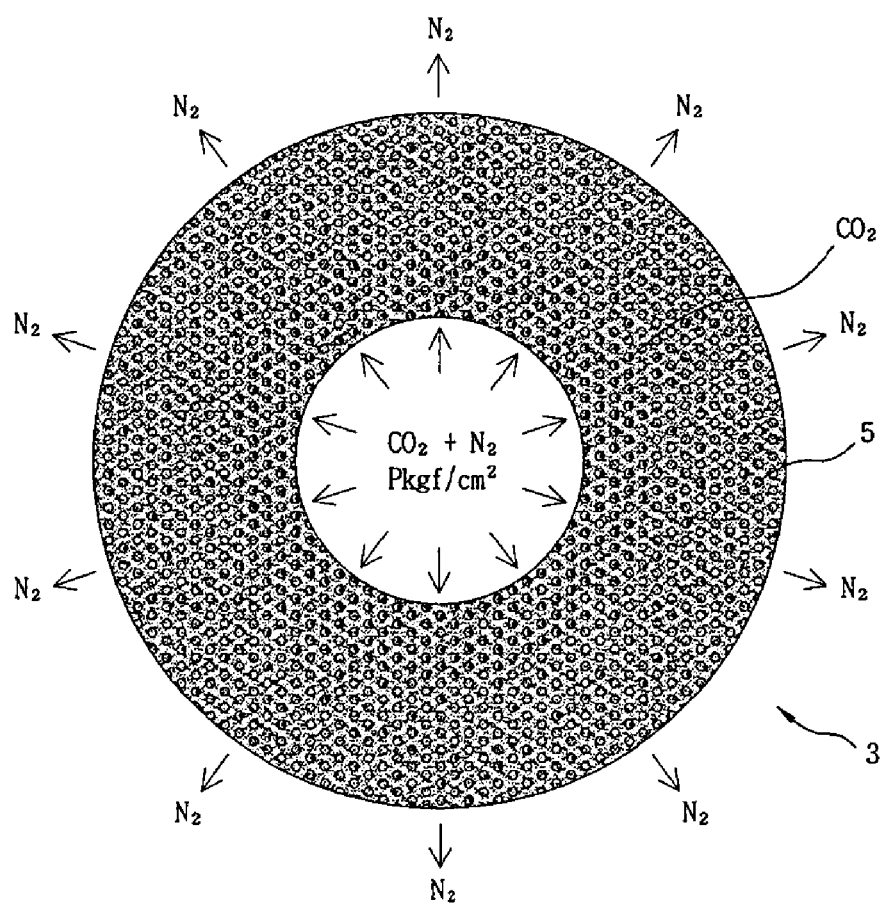
Figure 7:
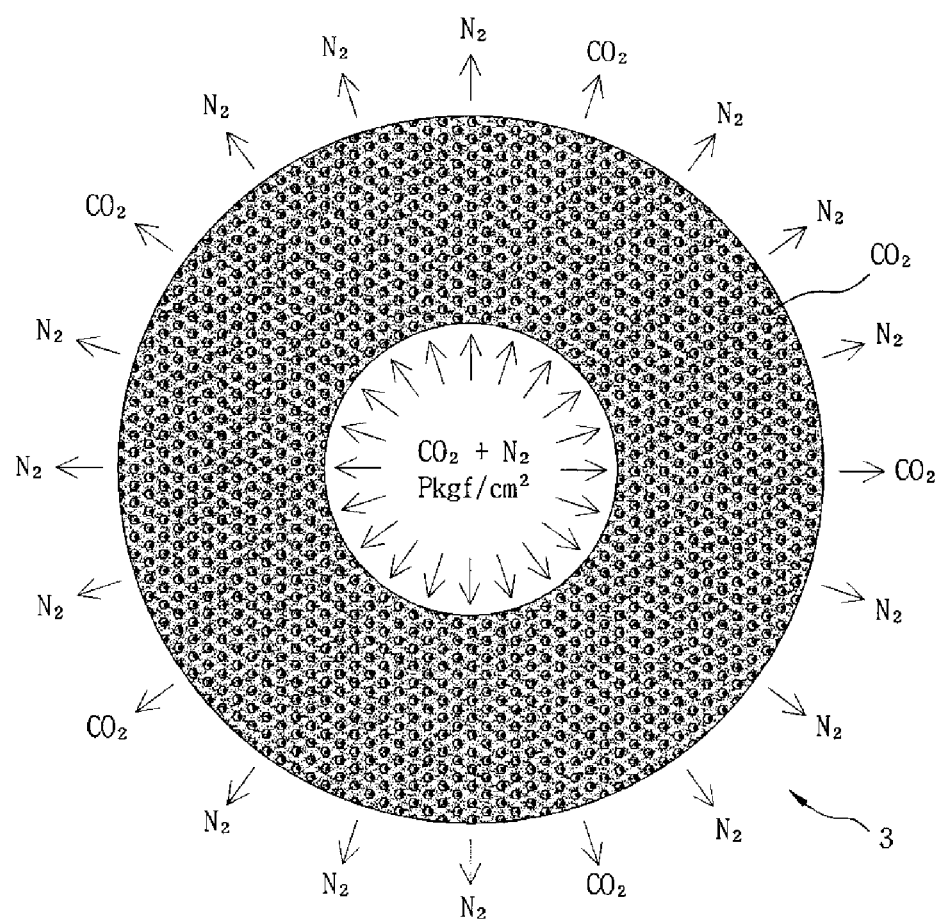

FIGS. 5 to 7 illustrate the adsorption process when a mixed gas ($CO_2+N_2$) is introduced into the inside of the adsorptive permeation hollow fiber membrane 3 illustrated in FIG. 4, and FIGS. 8 to 10 illustrate the adsorption process when a mixed gas ($CO_2+N_2$) is introduced into the outside of the adsorptive permeation hollow fiber membrane 3 illustrated in FIG. 4.

As illustrated in FIGS. 5 and 6, in the case of introducing a mixed gas ($CO_2+N_2$) into the inside of the adsorptive permeation hollow fiber membrane 3 according to the present invention at a constant pressure (P $kgf/cm^2$), the gas to be adsorbed ($CO_2$) is adsorbed to the adsorbent 5 and the gas not to be adsorbed ($N_2$) passes through the membrane to be discharged to the outside of the hollow fiber membrane since the adsorbent 5 is dispersed inside the porous hollow fiber membrane capable of permeating all the gases ($CO_2$ and $N_2$) constituting the mixed gas ($CO_2+N_2$) in a powder or crystalline powder form. In this procedure, the contact between the adsorbent 5 and the gas to be adsorbed ($CO_2$) uniformly and quickly proceeds in all directions, and thus the contact efficiency between the adsorbent 5 and the gas to be adsorbed is significantly excellent and most of the adsorbent 5 dispersed is effectively utilized in adsorption. As illustrated in FIG. 7, the gas to be adsorbed ($CO_2$) and the gas not to be adsorbed ($N_2$) both permeate the membrane when the adsorption of the gas to be adsorbed ($CO_2$) by the adsorbent 5 is in a saturated state.

Figure 8:
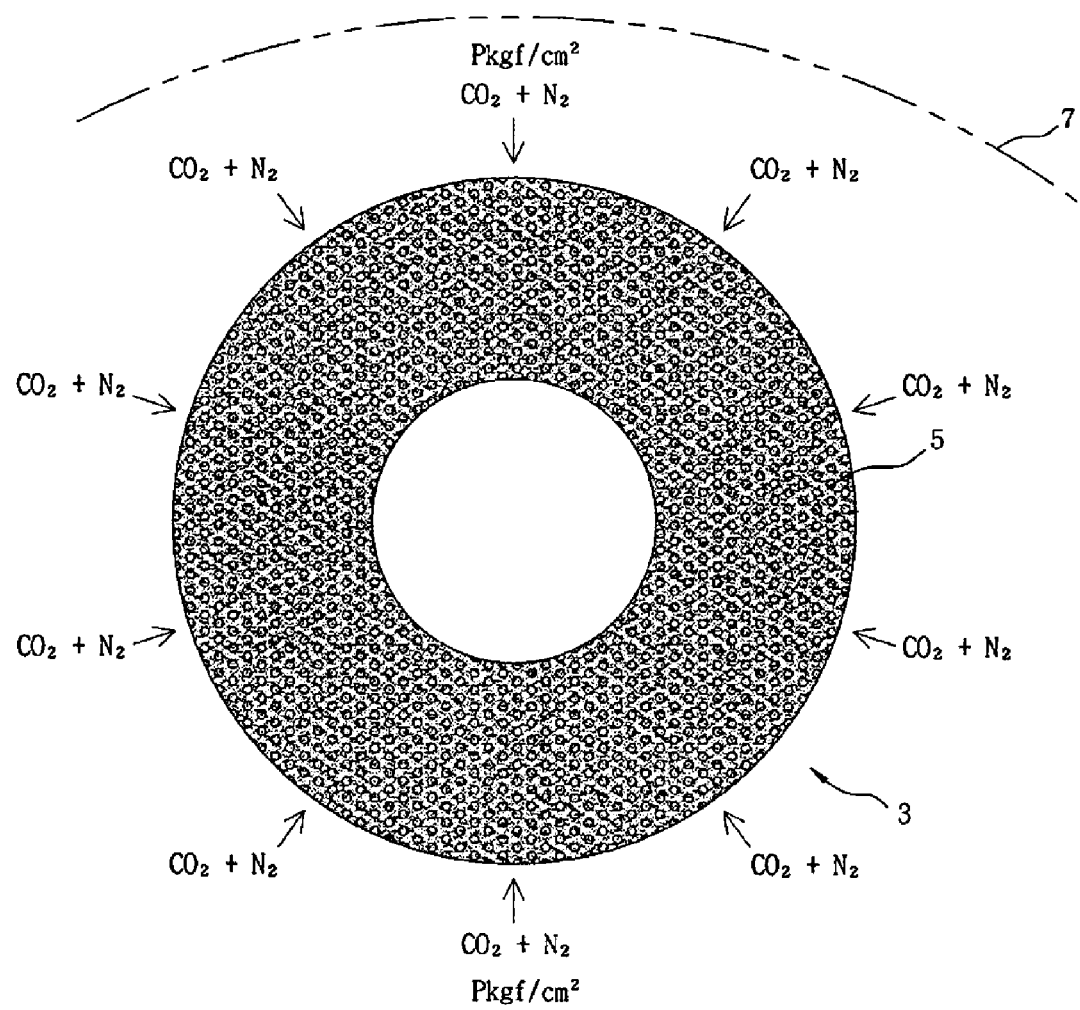
FIGS. 8 to 10 are adsorption process diagrams illustrating the adsorption process of a specific gas in the case of introducing a mixed gas into the outside of the adsorptive permeation hollow fiber membrane according to the present invention.
Figure 9:
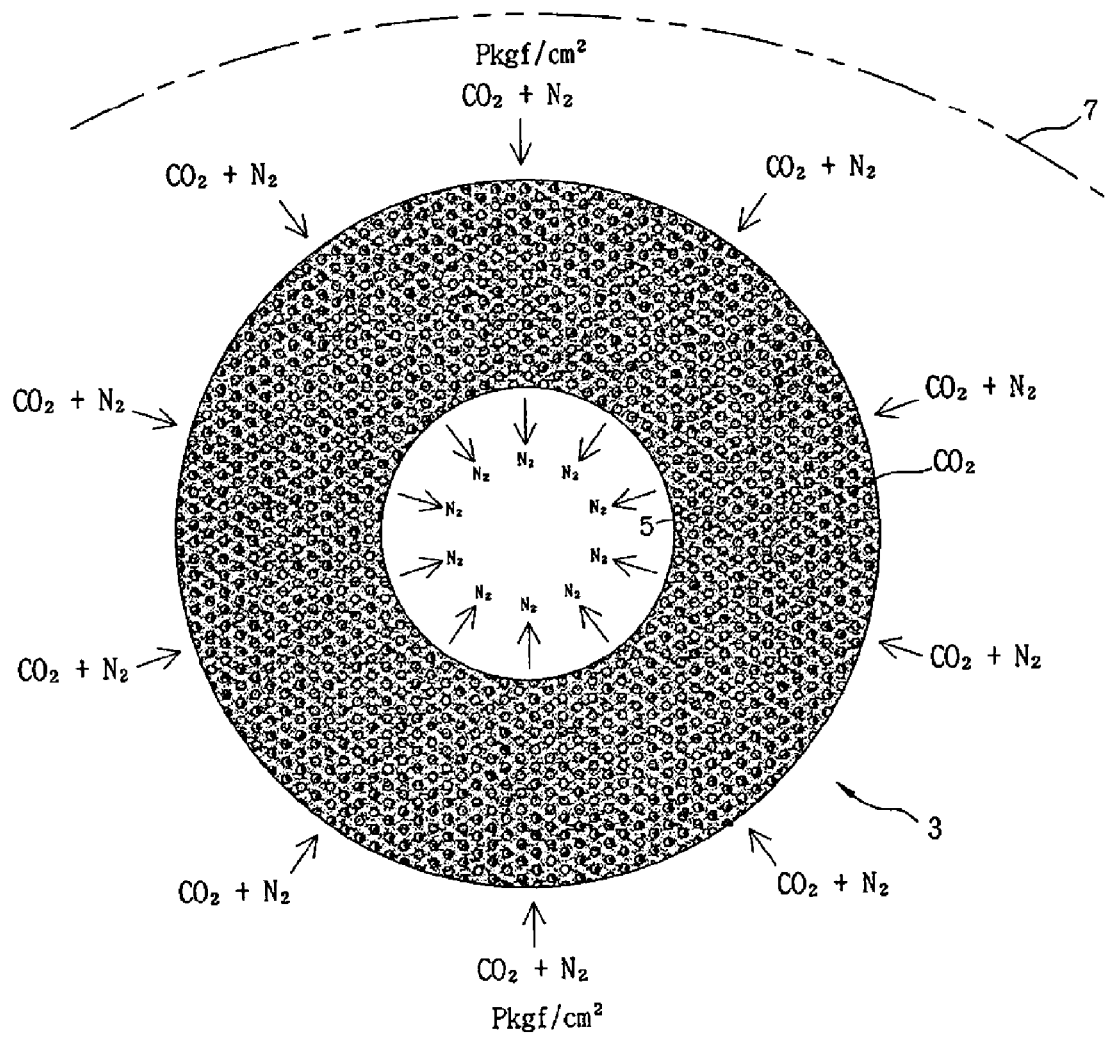
Figure 10:
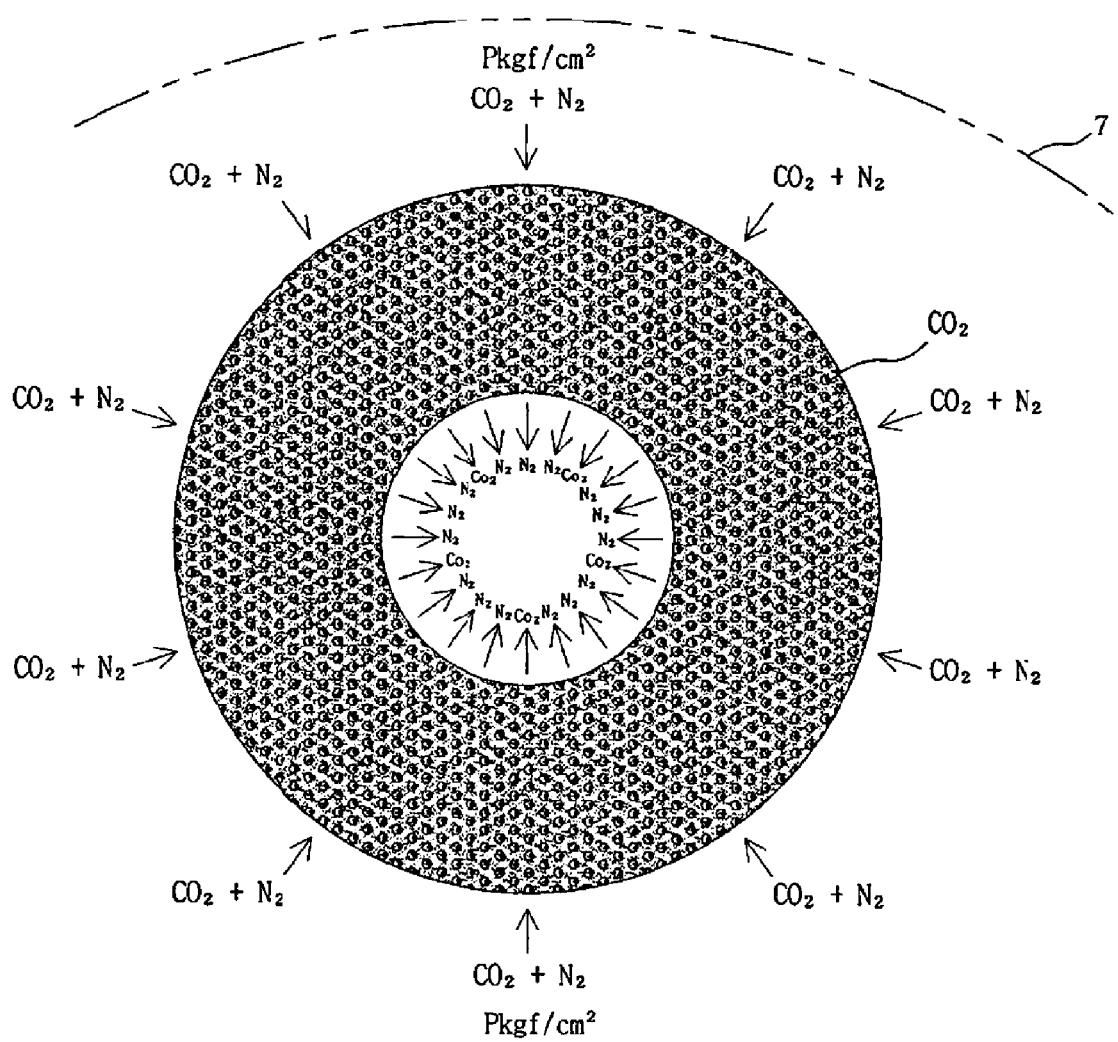

As illustrated in FIGS. 8 and 9, in the case of introducing a mixed gas ($CO_2+N_2$) into the outside of the adsorptive permeation hollow fiber membrane 3 according to the present invention at a constant pressure (P $kgf/cm^2$) as well, the gas to be adsorbed ($CO_2$) is adsorbed to the adsorbent 5 and the gas not to be adsorbed ($N_2$) passes through the membrane to be discharged to the inside of the hollow fiber membrane since the adsorbent 5 is dispersed inside the porous hollow fiber membrane capable of permeating all the gases ($CO_2$ and $N_2$) constituting the mixed gas ($CO_2+N_2$) in a powder or crystalline powder form. In this procedure, the contact between the adsorbent 5 and the gas to be adsorbed ($CO_2$) uniformly and quickly proceeds in all directions, and thus the contact efficiency between the adsorbent 5 and the gas to be adsorbed is significantly excellent and most of the adsorbent 5 dispersed is effectively utilized in adsorption. As illustrated in FIG. 10, the gas to be adsorbed ($CO_2$) and the gas not to be adsorbed ($N_2$) both permeate the membrane when the adsorption of the gas to be adsorbed ($CO_2$) by the adsorbent 5 is in a saturated state.

Figure 11:
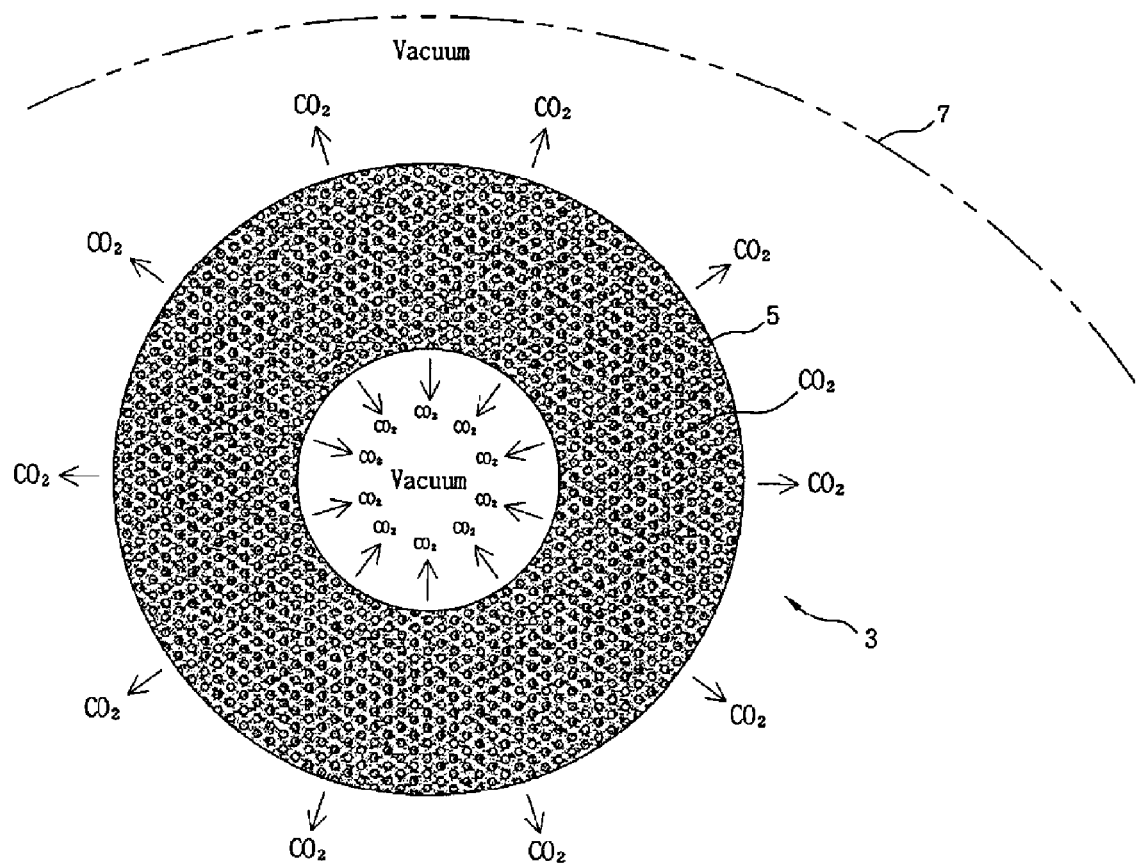
FIG. 11 is an adsorbent regeneration process diagram illustrating a specific gas desorption process of the adsorptive permeation hollow fiber membrane according to the present invention.

FIG. 11 illustrates a process to regenerate the adsorbent 5 by desorbing the adsorbed gas ($CO_2$) from the adsorbent 5. As illustrated in FIG. 7 or FIG. 10, the vacuum is simultaneously applied to the inside and outside of the hollow fiber membrane 3 in order to desorb the adsorbed gas ($CO_2$) from the adsorbent 5 when the adsorption of the gas to be adsorbed ($CO_2$) by the adsorbent 5 is in a saturated state. Such an adsorbent 5 regeneration process may be carried out before the adsorption by the adsorbent 5 reaches the saturated state. The adsorptive permeation hollow fiber membrane 3 according to the present invention exhibits permeability with respect to not only the gas not to be adsorbed ($N_2$) but also the gas to be adsorbed ($CO_2$), and thus the adsorbed gas passes through the membrane to be quickly discharged to the inside and outside of the membrane after being separated from the adsorbent in a case in which the vacuum is applied to the inside and outside of the hollow fiber membrane. The vacuum can be uniformly simultaneously applied to the inside and outside of the hollow fiber membrane in all directions at the time of desorbing the adsorbed gas for regeneration of the adsorbent 5 as well, and thus quick regeneration can be achieved.

Such adsorption process and regeneration process can be carried out with significantly low energy consumption. This is because the present invention utilizes a porous hollow fiber membrane that is nonselective with respect to the mixed gas to be introduced so as to enable permeation of the mixed gas and removal of the adsorbed gas even at a low pressure.

Figure 3:
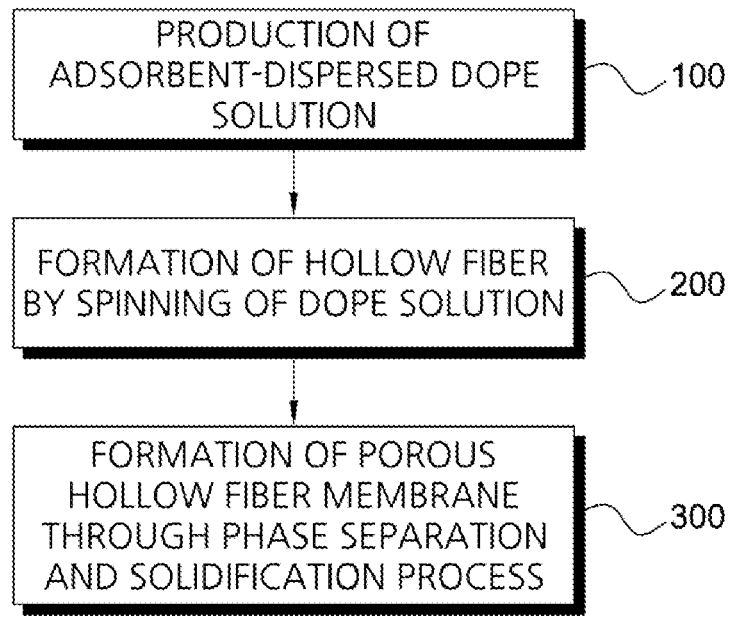
FIG. 3 is a manufacturing process diagram of the adsorptive permeation hollow fiber membrane according to the present invention.

As illustrated in FIG. 3, the adsorptive permeation hollow fiber membrane 3 according to the present invention having the advantages described above can be manufactured by a method including a step 100 of mixing the polymer, a diluent or a solvent, and the adsorbent to produce a dope solution in which the adsorbent is uniformly dispersed, a step 200 of spinning the adsorbent-dispersed dope solution to form a hollow fiber, and a step 300 of conducting phase separation and solidification of the hollow fiber so as to form a porous hollow fiber membrane which permeates the entire mixed gas intended to be separated.

More specifically, the adsorptive permeation hollow fiber membrane according to the present invention can be manufactured by thermally induced phase separation (TIPS) and non-solvent induced phase separation (NIPS) which are known in the art. In the case of using thermally induced phase separation, the adsorptive permeation hollow fiber membrane can be manufactured by a process including a step of mixing the polymer, a diluent, and the adsorbent to produce an adsorbent-dispersed dope solution, a step of spinning the adsorbent-dispersed dope solution to form a hollow fiber, and a step of cooling the hollow fiber at a cooling speed at which a porous hollow fiber membrane can be formed. In the case of using non-solvent induced phase separation, the adsorptive permeation hollow fiber membrane can be manufactured by a process including a step of mixing the polymer, a solvent, and the adsorbent to produce an adsorbent-dispersed dope solution, a step of spinning the adsorbent-dispersed dope solution to form a hollow fiber, and a step of conducting phase separation and solidification of the hollow fiber by the exchange action between the solvent and the non-solvent so as to form a porous hollow fiber membrane. In these processes, the composition ratio of the components constituting the dope solution and the porosity of the hollow fiber membrane can be appropriately selected by the practitioner in consideration of the kind, phase and the like of the mixed gas, and thus the ranges thereof are not required to be particularly limited.

The adsorbent is preferably contained in the dope solution at a proportion of from 15% by weight to 60% by weight. The adsorption efficiency decreases when the amount of the adsorbent is less than 15% by weight, and the tissue of the hollow fiber membrane is too weak when the amount of the adsorbent is more than 60% by weight. The rest of the dope solution is the polymer and a diluent or a solvent, and the mixing ratio thereof is set in conformity with the ratio required in thermally induced phase separation (TIPS) and non-solvent induced phase separation (NIPS) which are known in the art.

Figure 12:
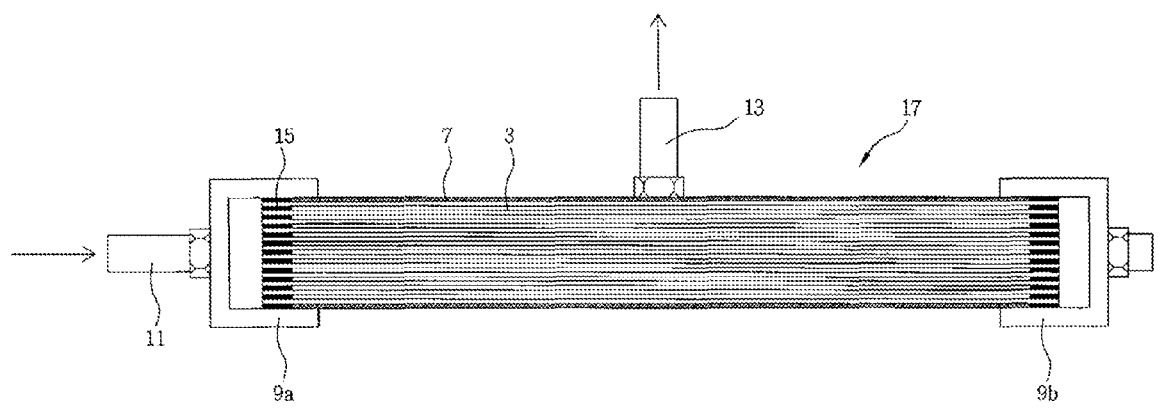
FIG. 12 is a longitudinal sectional view of the hollow fiber membrane module for hollow fiber membrane internal introduction utilizing the adsorptive permeation hollow fiber membrane according to the present invention.
Figure 13:
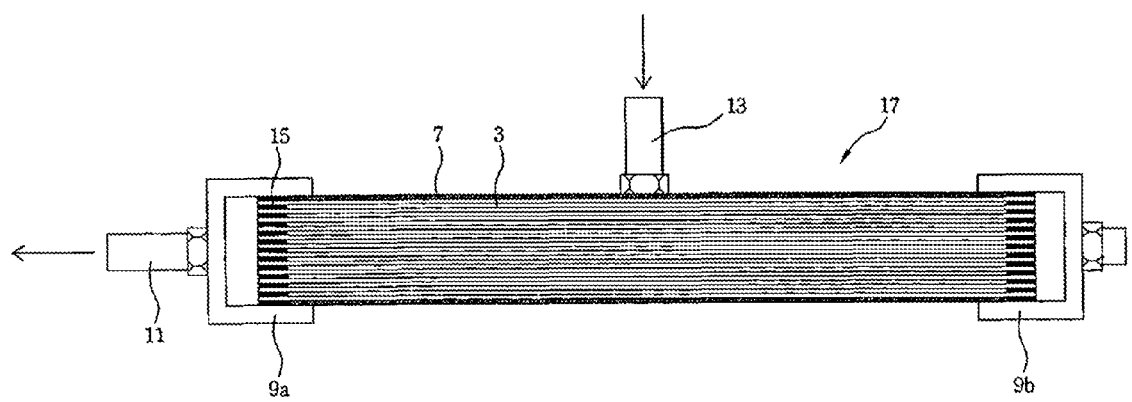
FIG. 13 is a longitudinal sectional view of the hollow fiber membrane module for hollow fiber membrane external introduction utilizing the adsorptive permeation hollow fiber membrane according to the present invention.

As illustrated in FIGS. 12 and 13, a hollow fiber membrane module 17 can be manufactured by assembling a great number of the adsorptive permeation hollow fiber membranes 3 according to the present invention, potting both ends of the assembly with a potting resin 15, and then inserting the assembly inside a housing composed of a housing body 7 and housing caps 9a and 9b. At this time, the housing cap 9a at one end of the housing body 7 is provided with a hollow fiber internal communication port 11, the housing body 7 is provided with a hollow fiber external communication port 13, and the housing cap 9b at the other end of the housing body 7 is closed. As illustrated in FIG. 12, in the case of introducing the mixed gas into the hollow fiber internal communication port 11, the mixed gas enters the inside of the adsorptive permeation hollow fiber membrane 3 and the gas that has permeated through the adsorptive permeation hollow fiber membrane 3 passes through the inside of the housing to be discharged to the outside of the module through the hollow fiber external communication port 13. As illustrated in FIG. 13, in the case of introducing the mixed gas into the hollow fiber external communication port 13, the mixed gas enters the outside of the adsorptive permeation hollow fiber membrane 3 and the gas that has permeated through the adsorptive permeation hollow fiber membrane 3 passes through the inside of the housing to be discharged to the outside of the module through the hollow fiber internal communication port 11.

As described above, the hollow fiber membrane module 17 which includes a great number of the adsorptive permeation hollow fiber membranes 3 according to the present invention inside the housing as an assembly and the housing provided with the hollow fiber internal communication port 11 through which the mixed gas can enter and exit the inside of the hollow fiber membrane and the hollow fiber external communication port 13 through which the mixed gas can enter and exit the outside of the hollow fiber membrane can be utilized in gas adsorptive/desorptive separation systems of various structures.

Figure 14:
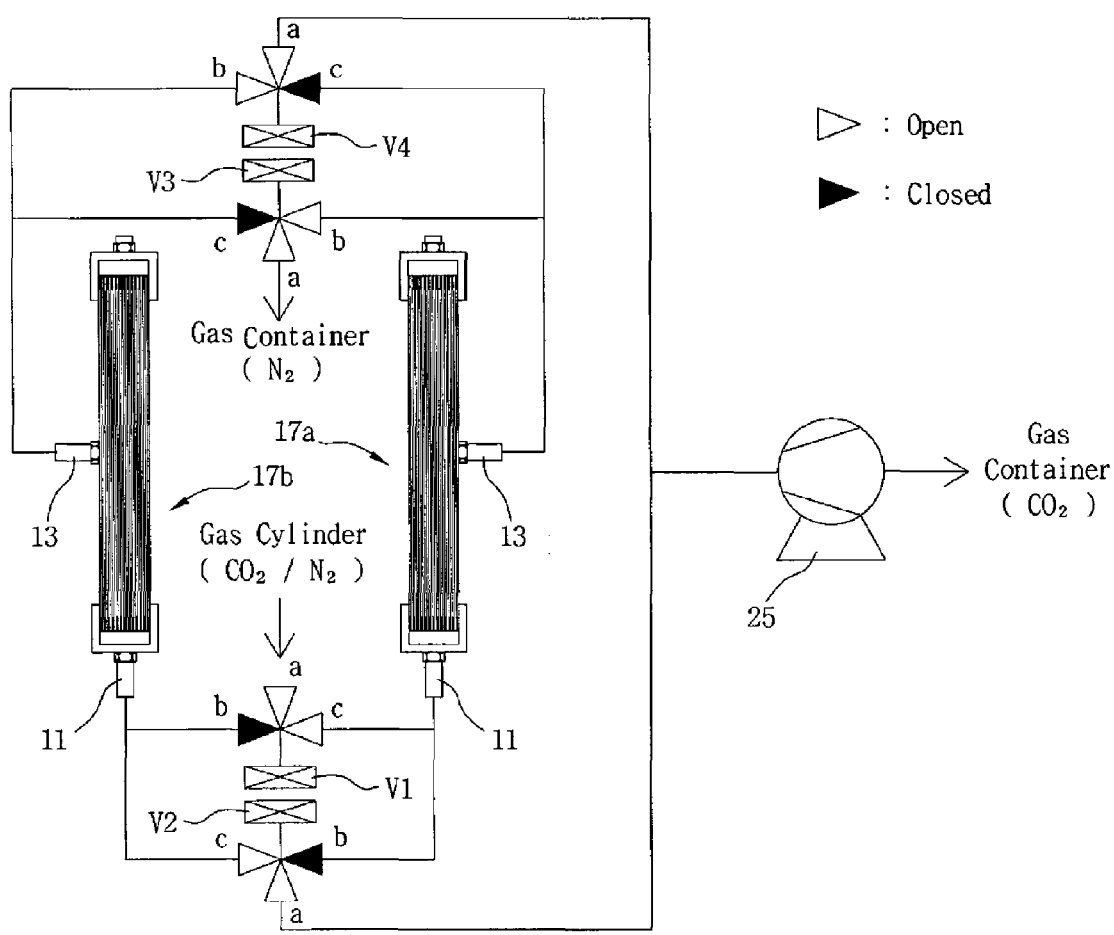
FIG. 14 is a block diagram of a gas adsorptive/desorptive separation system configured by linking two hollow fiber membrane modules for hollow fiber membrane internal introduction illustrated in FIG. 12 so as to enable vacuum swing adsorption.
Figure 15:
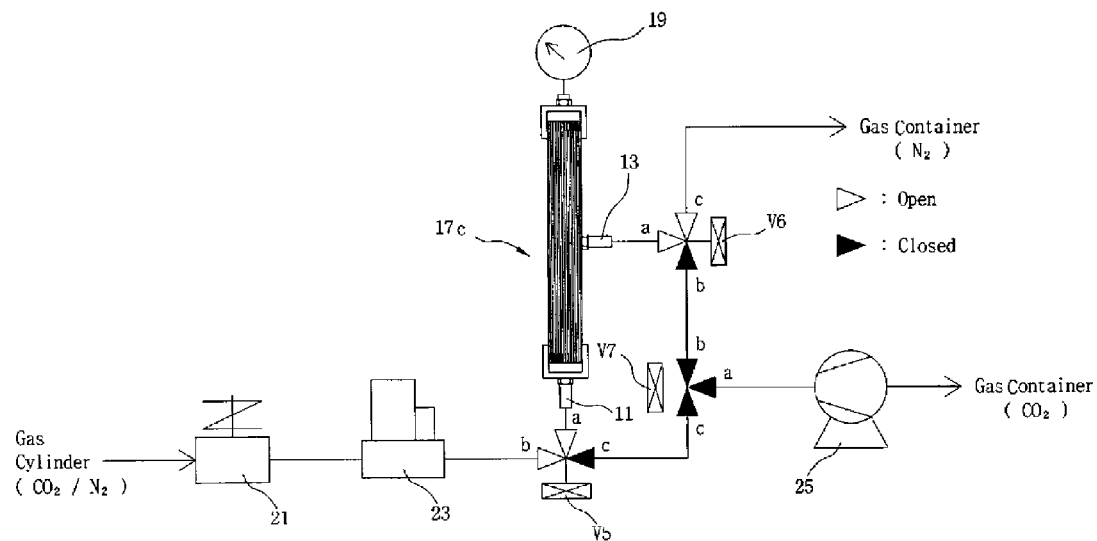
FIGS. 15 and 16 are block diagrams of gas adsorptive/desorptive separation systems utilizing one hollow fiber membrane module for hollow fiber membrane internal introduction illustrated in FIG. 12.
Figure 16:
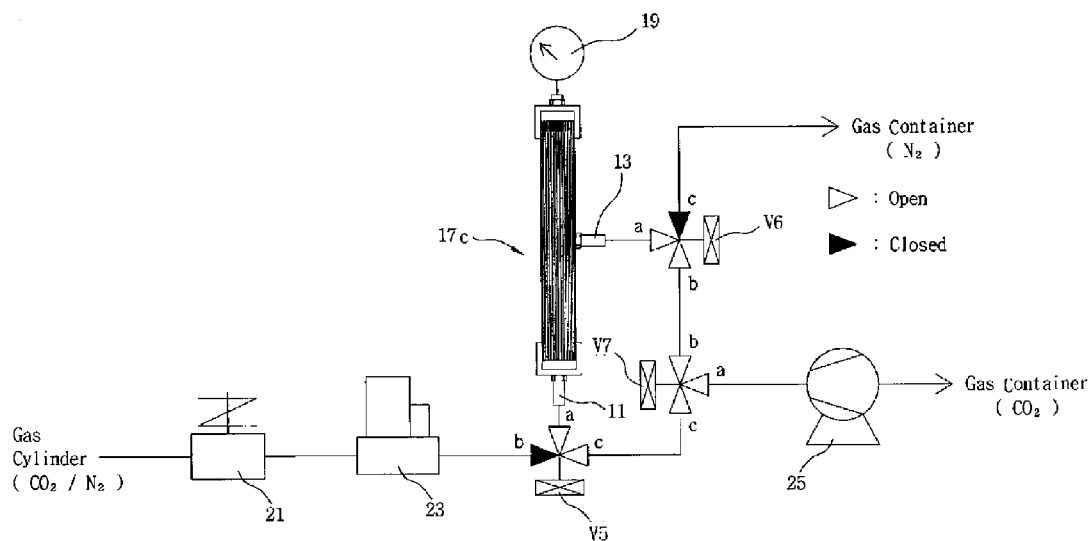

FIG. 14 is a block diagram of a gas adsorptive/desorptive separation system configured by linking two hollow fiber membrane modules described above so as to enable vacuum swing adsorption, and FIGS. 15 and 16 are block diagrams of gas adsorptive/desorptive separation systems utilizing one hollow fiber membrane module described above. All of the gas adsorptive/desorptive separation systems illustrated in FIGS. 14 to 16 are a system configured to adopt the hollow fiber membrane module illustrated in FIG. 12 and thus to introduce the mixed gas into the inside of the hollow fiber membrane. However, the systems illustrated in FIGS. 14 to 16 become a system that can introduce the mixed gas into the outside of the hollow fiber membrane when the mixed gas supply device is connected to the hollow fiber external communication port 13 of each of the hollow fiber membrane modules and the nonadsorbed gas is discharged through the hollow fiber internal communication port 11 of each of the hollow fiber membrane modules.

As illustrated in FIG. 14, for vacuum swing adsorption, the gas adsorptive/desorptive separation systems can be configured by at least two hollow fiber membrane modules 17a and 17b, a vacuum pump 25, and a gas flow path switching means. The gas flow path switching means is equipped with a means that can selectively connect the hollow fiber internal communication port 11 of the first hollow fiber membrane module 17a or the hollow fiber internal communication port 11 of the second hollow fiber membrane module 17b to the mixed gas supply device or the vacuum pump 25 and a means that can selectively connect the hollow fiber external communication port 13 of the first hollow fiber membrane module 17a or the hollow fiber external communication port 13 of the second hollow fiber membrane module 17b to the outside (the outside may be a separate gas container or the air, the same shall apply hereinafter) or the vacuum pump 25. Via these means, the gas flow path switching means connects the hollow fiber internal communication port 11 of the first hollow fiber membrane module 17a to the mixed gas supply device and the hollow fiber external communication port 13 of the first hollow fiber membrane module 17a to the outside and thus connects the hollow fiber internal communication port 11 and the hollow fiber external communication port 13 of the second hollow fiber membrane module 17b to the vacuum pump 25 when the adsorption process proceeds in the first hollow fiber membrane module so that the adsorbent regeneration process proceeds in the second hollow fiber membrane module 17b, and connects the hollow fiber internal communication port 11 and the hollow fiber external communication port 13 of the first hollow fiber membrane module 17a to the vacuum pump 25 and thus connects the hollow fiber internal communication port 11 of the second hollow fiber membrane module 17b to the mixed gas supply device and the hollow fiber external communication port 13 of the second hollow fiber membrane module 17b to the outside when the adsorbent regeneration process proceeds in the first hollow fiber membrane module 17a so that the adsorption process proceeds in the second hollow fiber membrane module.

In FIG. 14, the gas flow path switching means is configured by four three-way valves (V1, V2, V3, and V4). These four three-way valves are all a solenoid valve and controlled by a known controller. These four three-way valves are opened and closed when the adsorption process proceeds in first hollow fiber membrane module 17a so that the adsorbent regeneration process proceeds in the second hollow fiber membrane module 17b. A first port (a) of the three-way valve V1 is connected to the mixed gas supply device, a second port (b) is connected to the hollow fiber internal communication port 11 of the second hollow fiber membrane module 17b, and a third port (c) is connected to the hollow fiber internal communication port 11 of the first hollow fiber membrane module 17a, and thus the mixed gas ($CO_2+N_2$) is introduced into the second hollow fiber membrane module 17b or the first hollow fiber membrane module 17a when the first port (a) is selectively connected to the second port (b) or the third port (c). A first port (a) of the three-way valve V2 is connected to the vacuum pump 25, a second port (b) is connected to the hollow fiber internal communication port 11 of the first hollow fiber membrane module 17a, and a third port (c) is connected to the hollow fiber internal communication port 11 of the second hollow fiber membrane module 17b, and thus the inside of the hollow fiber membranes of the first hollow fiber membrane module 17a and the inside of the hollow fiber membranes of the second hollow fiber membrane module 17b are selectively connected to the vacuum pump 25 when the first port (a) is selectively connected to the second port (b) or the third port (c). A first port (a) of the three-way valve V3 is connected to the outside, a second port (b) is connected to the hollow fiber external communication port 13 of the first hollow fiber membrane module 17a, and a third port (c) is connected to the hollow fiber external communication port 13 of the second hollow fiber membrane module 17b, and thus the nonadsorbed gas ($N_2$) that has permeated through the adsorptive permeation hollow fiber membrane 3 is discharged to the outside through the hollow fiber external communication port 13 of the first hollow fiber membrane module 17a or the hollow fiber external communication port 13 of the second hollow fiber membrane module 17b when the first port (a) is selectively connected to the second port (b) or the third port (c). A first port (a) of the three-way valve V4 is connected to the vacuum pump 25, a second port (b) is connected to the hollow fiber external communication port 13 of the second hollow fiber membrane module 17b, and a third port (c) is connected to the hollow fiber external communication port 13 of the first hollow fiber membrane module 17a, and thus the adsorbed gas ($CO_2$) that is released from the adsorbent 5 in the adsorptive permeation hollow fiber membrane is discharged toward the vacuum pump 25 through the hollow fiber external communication port 13 of the second hollow fiber membrane module 17b or the hollow fiber external communication port 13 of the first hollow fiber membrane module 17a when the first port (a) is selectively connected to the second port (b) or the third port (c).

In a state in which the valves are opened and closed as illustrated in FIG. 14, the three-way valve V1 connects the hollow fiber internal communication port 11 of the first hollow fiber membrane module 17a to the mixed gas supply device and the three-way valve V3 connects the hollow fiber external communication port 13 of the first hollow fiber membrane module 17a to the outside, and thus the adsorption process that the gas to be adsorbed ($CO_2$) is adsorbed to the adsorbent 5 in the first hollow fiber membrane module 17a and the gas not to be adsorbed ($N_2$) permeates through the adsorptive permeation hollow fiber membrane 3 to be discharged to the outside proceeds. The three-way valve V2 connects the hollow fiber internal communication port 11 of the second hollow fiber membrane module 17b to the vacuum pump 25 and the three-way valve V4 connects the hollow fiber external communication port 13 of the second hollow fiber membrane module 17b to the vacuum pump 25, and thus the adsorbent regeneration process that the adsorbed gas ($CO_2$) which has adsorbed to the adsorbent 5 in the second hollow fiber membrane module 17b is released from the adsorbent 5 to be discharged toward the vacuum pump 25 proceeds. The adsorbent regeneration process proceeds in the first hollow fiber membrane module 17a and the adsorption process proceeds in the second hollow fiber membrane module 17b when the opening and closing directions of each of the three-way valves are switched.

The nonadsorbed gas ($N_2$) discharged to the outside from the gas adsorptive/desorptive separation system illustrated in FIG. 14 can be stored in a gas container for nonadsorbed gas discharged to the air.

In the case of injecting the mixed gas into the outside of the adsorptive permeation hollow fiber membrane as illustrated in FIG. 13, unlike FIG. 14, the hollow fiber external communication port 13 of each of the hollow fiber membrane modules 17a and 17b becomes an inlet of the mixed gas ($CO_2+N_2$) in the adsorption process and an outlet of the adsorbed gas ($CO_2$) in the adsorbent regeneration process, and the hollow fiber internal communication port 11 of each of the hollow fiber membrane modules 17a and 17b becomes an outlet of the nonadsorbed gas ($N_2$) in the adsorption process and an outlet of the adsorbed gas ($CO_2$) in the adsorbent regeneration process. Hence, although it is not separately illustrated in a drawing, in the gas adsorptive/desorptive separation system in which the mixed gas is introduced into the outside of the hollow fiber membrane, the gas flow path switching means connects the hollow fiber external communication port 13 of the first hollow fiber membrane module 17a to the mixed gas supply device and the hollow fiber internal communication port 11 of the first hollow fiber membrane module 17a to the outside and thus connects the hollow fiber internal communication port 11 and the hollow fiber external communication port 13 of the second hollow fiber membrane module 17b to the vacuum pump 25 when the adsorption process proceeds in the first hollow fiber membrane module 17a so that the adsorbent regeneration process proceeds in the second hollow fiber membrane module 17b, and connects the hollow fiber internal communication port 11 and the hollow fiber external communication port 13 of the first hollow fiber membrane module 17a to the vacuum pump 25 and thus connects the hollow fiber external communication port 13 of the second hollow fiber membrane module 17b to the mixed gas supply device and the hollow fiber internal communication port 11 of the second hollow fiber membrane module 17b to the outside when the adsorbent regeneration process proceeds in the first hollow fiber membrane module 17a so that the adsorption process proceeds in the second hollow fiber membrane module 17b.

According to the present invention, it is possible to easily change the adsorption/desorption capacity by increasing the number of hollow fiber membrane modules or the number of adsorptive permeation hollow fiber membranes in each module, and thus there is also an advantage that the size of the gas adsorptive/desorptive separation system can be easily diversified from those for small separation to those for bulk separation.

EXAMPLES

Figure 19:
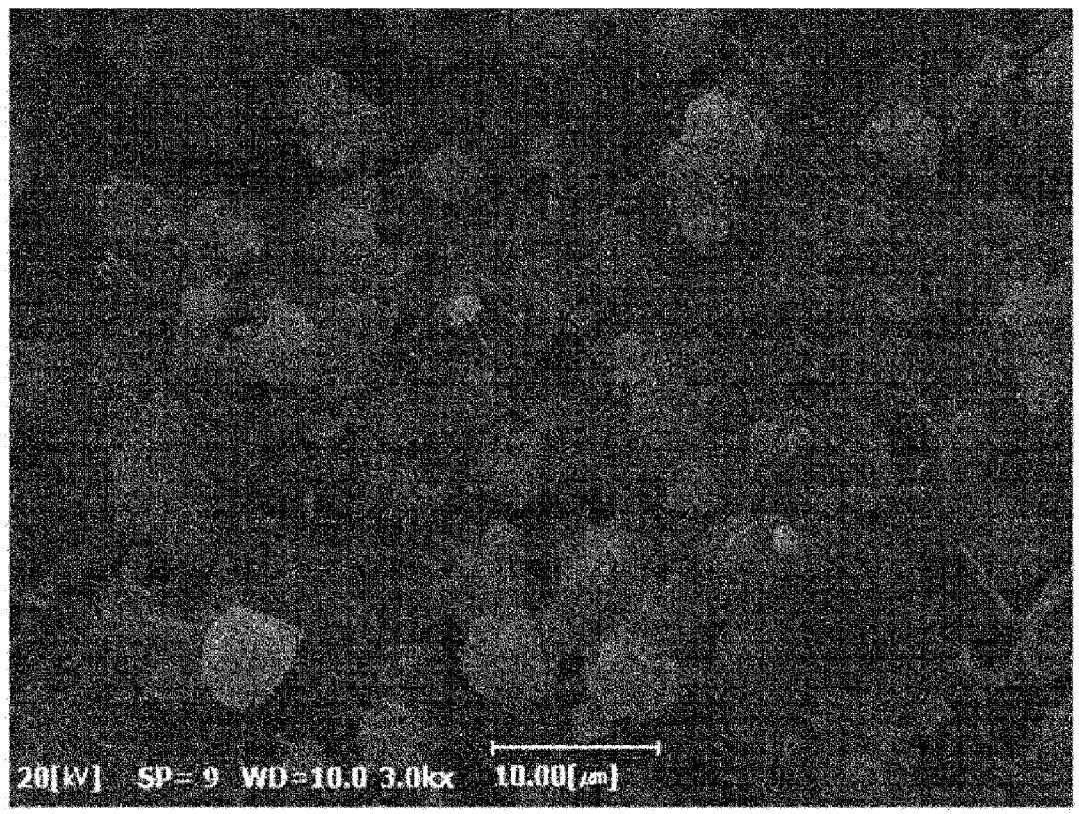
FIG. 19 is a scanning electron microscope (SEM) image for the inner surface of the adsorptive permeation hollow fiber membrane according to Example of the present invention.

In Examples, polypropylene was used as the dope solution, a solution of latent solvent and non-solvents was used as the diluent, and zeolite 5A was used as the adsorbent. The thermally induced phase preparation process (TIPS) was used as the hollow fiber spinning method in the membrane manufacturing process. In this spinning method, twin-screw extrusion was adopted for mixing the dope solution. The spinning temperature was maintained at 220° C. The cooling speed was controlled at a speed at which a porous membrane capable of permeating both carbon dioxide and nitrogen can be formed. FIG. 17 is a scanning electron microscope (SEM) image for the cross section of the adsorptive permeation hollow fiber membrane manufactured by the present Example. FIG. 18 is a scanning electron microscope (SEM) image for the outer surface of the adsorptive permeation hollow fiber membrane manufactured by the present Example. FIG. 19 is a scanning electron microscope (SEM) image for the inner surface of the adsorptive permeation hollow fiber membrane according to Example of the present invention. From these images, it can be seen that the adsorptive permeation hollow fiber membrane according to the present invention has a highly porous sponge structure in which the pores formed and the adsorbent dispersed are highly symmetric with respect to the thickness direction or spinning direction of the membrane and there are a great number of pores.

In order to test the adsorptive permeation hollow fiber membrane thus manufactured, as illustrated in FIGS. 15 and 16, a gas adsorption/desorption separation system was configure by one hollow fiber membrane module 17c, three three-way valves (V5, V6, and V7), and one vacuum pump 25. A pressure gauge 19 was attached to the housing cap that was not provided with a hollow fiber internal communication port in order to measure the pressure applied to the inside of the adsorptive permeation hollow fiber membrane. In order to test the adsorption process, as illustrated in FIG. 15, the first port (a) and the second port (b) of the three-way valve V5 were connected to each other and the mixed gas ($CO_2+N_2$) at 30° C. was introduced into the hollow fiber internal communication port 11 of the hollow fiber membrane module 17c at a pressure of 0.3 atm using a mixed gas supply device composed of a gas cylinder, a pressure regulator, and a mass flow controller. In addition, the first port (a) and the third port (c) of the three-way valve V6 were connected to each other and thus the nonadsorbed gas which had been discharged through the hollow fiber external communication port 13 of the hollow fiber membrane module 17c was collected in the gas container. The proportion of carbon dioxide in the gas collected in the gas container for nonadsorbed gas was measured by the permeation time while changing the composition of dope solution and the flow rate (SCCM) of the mixed gas introduced.

Figure 20:
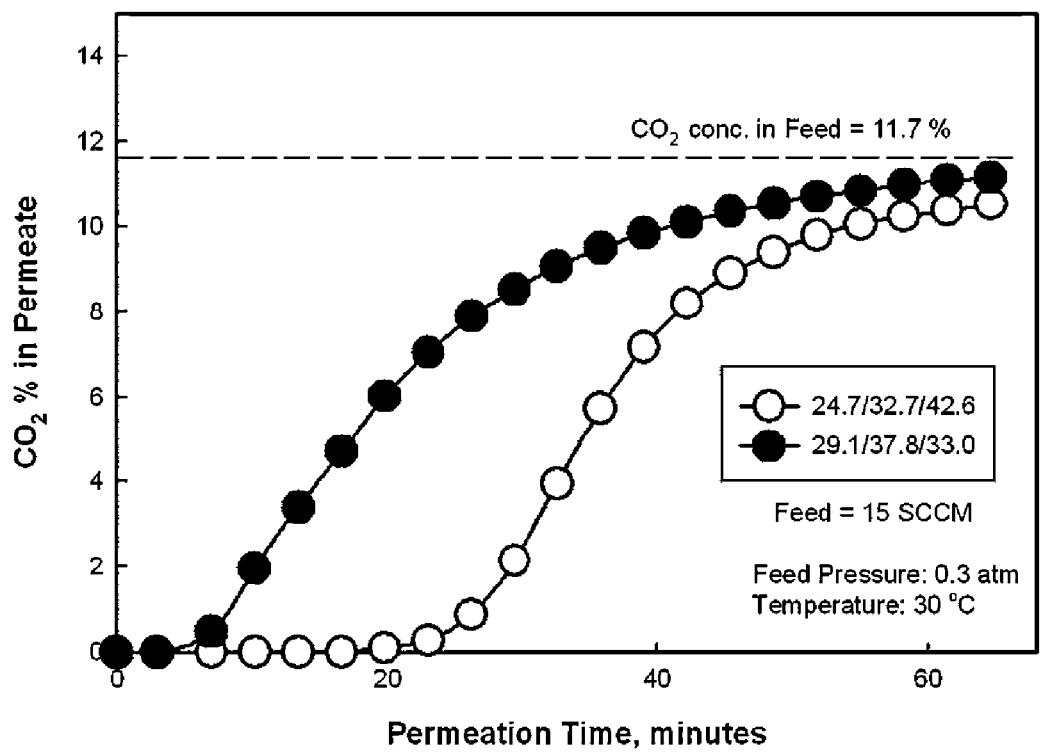
FIGS. 20 and 21 are graphs illustrating the proportion of the adsorbed gas contained in the permeated substance to the permeation time in the case of changing the amount of adsorbent.

FIG. 20 is a graph illustrating the proportion of carbon dioxide in the permeated gas to the permeation time in a case (first dope solution) in which the ratio (% by mass) of polypropylene/diluent/zeolite 5A in the dope solution is 24.7/32.7/42.6 and a case (second dope solution) in which the ratio is 29.1/37.8/33.0. Meanwhile, the temperature of mixed gas, the pressure of the mixed gas introduced, and the flow rate (SCCM) of the mixed gas introduced are constantly maintained at 30° C., 0.3 atm, and 15 SCCM, respectively, in both cases. It can be seen that the adsorbent is saturated after 20 minutes in the case of the first dope solution having a relatively greater amount of adsorbent, and the adsorbent is saturated in 5 minutes in the case of the second dope solution having a relatively smaller amount of adsorbent. It can be seen that the concentration of carbon dioxide in the nonadsorbed gas increases more and more and approaches to the concentration of carbon dioxide in the mixed gas introduced after the adsorbent is saturated.

Figure 21:
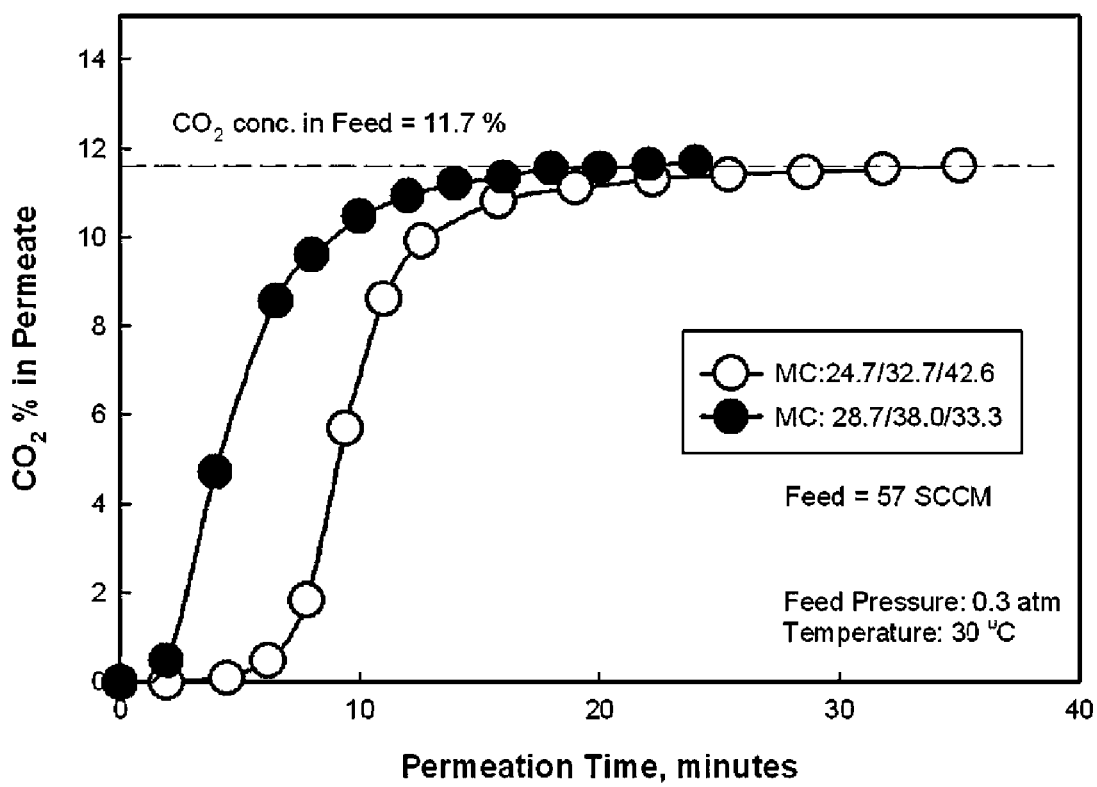

FIG. 21 is a graph illustrating the proportion of carbon dioxide in the permeated gas to the permeation time in a case (first dope solution) in which the ratio (% by mass) of polypropylene/diluent/zeolite 5A in the dope solution is 24.7/32.7/42.6 and a case (second dope solution) in which the ratio is 29.1/37.8/33.0. Meanwhile, the temperature of mixed gas, the pressure of the mixed gas introduced, and the flow rate (SCCM) of the mixed gas introduced are constantly maintained at 30° C., 0.3 atm, and 57 SCCM, respectively, in both cases. It can be seen that the adsorbent is saturated after about 5 minutes in the case of the first dope solution having a relatively greater amount of adsorbent, and the adsorbent is saturated in about 2 to 3 minutes in the case of the second dope solution having a relatively smaller amount of adsorbent when the flow rate of the mixed gas introduced is increased as above. It can be seen that the concentration of carbon dioxide in the nonadsorbed gas increases more and more and approaches to the concentration of carbon dioxide in the mixed gas introduced in a short time after the adsorbent is saturated.

Figure 22:
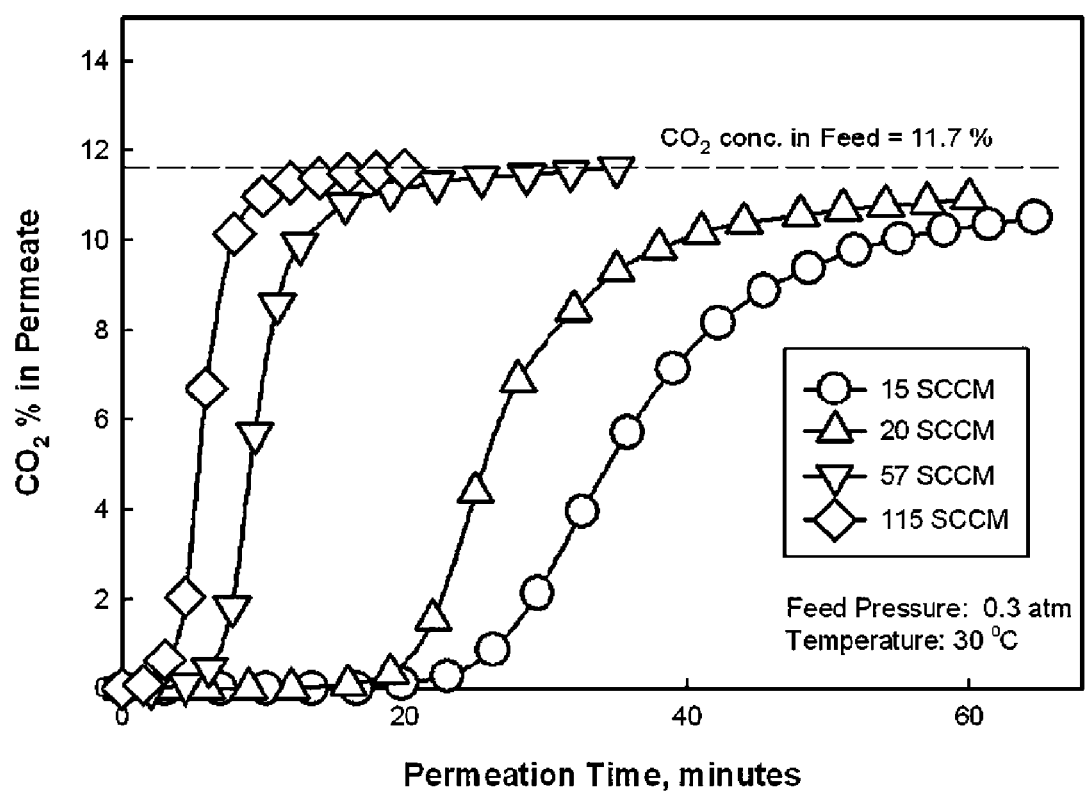
FIG. 22 is a graph illustrating the proportion of the adsorbed gas contained in the permeated substance to the permeation time depending on a change in flow rate in the case of having the same amount of adsorbent.

FIG. 22 is a graph illustrating the proportion of carbon dioxide in the permeated gas to the permeation time in a case in which the flow rate (SCCM) of the mixed gas introduced is changed while maintaining the temperature of mixed gas, the pressure of the mixed gas introduced, and the ratio (% by mass) of polypropylene/diluent/zeolite 5A at 30° C., 0.3 atm, and 24.7/32.7/42.6, respectively. From this, it can be seen that the adsorbent more rapidly reaches the saturation state as the flow rate is greater in the case of changing the flow rate (SCCM) of the mixed gas introduced.

As described above, the present invention mainly utilizes the adsorption principle for separation. Only a specific gas component is adsorbed as the mixed gas is brought into uniform contact with the adsorbent dispersed in the porous hollow fiber membrane.

For the adsorptive permeation hollow fiber membrane according to the present invention, it is possible to quickly apply a vacuum or reduced pressure to both sides of the adsorptive permeation hollow fiber membrane in order to discharge the gas component adsorbed. FIG. 16 illustrates an example of simultaneously applying a vacuum to the hollow fiber internal communication port 11 and hollow fiber external communication port 13 of the hollow fiber membrane module 17c for regeneration of the adsorbent. The desorption of the adsorbed gas simultaneously proceeds in all regions of the adsorptive permeation hollow fiber membrane constituting the module, and the desorption proceeds in both directions of the inner and outer sides of the hollow fiber membrane in the desorption process, and thus it takes a significantly short time to regenerate the saturated adsorbent and low energy consumption is required.

The present invention relates to an adsorptive permeation hollow fiber membrane, in more detail, the adsorptive permeation hollow fiber membrane can be effectively utilized in a variety of facility fields to separate carbon dioxide and an acid gas contained in exhaust gases discharged from power plants, factories, chemical processes and the like or a general gas mixture and the like.

REFERENCE SIGNS LIST

1: porous hollow fiber membrane
3: adsorptive permeation hollow fiber membrane
5: adsorbent
7: housing body
9a and 9b: a housing cap
11: hollow fiber internal communication port
13: hollow fiber external communication port
15: potting resin
17, 17a, 17b, and 17c: hollow fiber membrane module
19: pressure gauge
21: pressure regulator
23: mass flow controller
25: vacuum pump

What is claimed is:

1. A method of manufacturing an adsorptive hollow fiber membrane, comprising:
a step of mixing a polymer, a diluent, and an adsorbent to produce an adsorbent-dispersed dope solution;
a step of spinning the adsorbent-dispersed dope solution to form a hollow fiber member having a generally annular shape with an exterior surface forming an outer boundary of the hollow fiber member and with an inner hollow passageway disposed within the hollow fiber member; and
a step of cooling the hollow fiber member so as to form, by thermally induced phase separation (TIPS) method, the hollow fiber membrane having pores interconnected throughout the hollow fiber membrane, the pores being in fluid communication with the inner hollow passageway and having permeability to the entire mixed gas intended to be separated.

2. The method of manufacturing the adsorptive hollow fiber membrane according to claim 1, wherein the adsorbent is contained in the dope solution at a proportion of from 15% by weight to 60% by weight.

3. A gas adsorptive-desorptive separation system comprising:
a first hollow fiber membrane module including a plurality of a first group of adsorptive
hollow fiber membranes inside a housing as an assembly and the
housing provided with a hollow fiber internal communication port through which a gas is
injected into the inside of the first group of adsorptive hollow fiber membranes and a hollow fiber external communication port through which the gas permeated through the adsorptive hollow fiber membranes is discharged;
a second hollow fiber membrane module including a plurality of a second group of adsorptive
hollow fiber membranes inside a housing as an assembly and the
housing provided with a hollow fiber internal communication port through which the is injected into the inside of the second group of adsorptive hollow fiber membranes and a hollow fiber external communication port through which the gas permeated through the adsorptive hollow fiber membrane is discharged;

wherein each of the adsorptive hollow fiber membranes of the first and second hollow fiber membrane modules comprises:
- a fiber member of a porous fiber material with pores interconnected throughout the fiber material, said fiber member having a generally annular shape with an exterior surface forming an outer boundary of the fiber member and with an inner hollow passageway disposed within the fiber member, with the pores of the fiber member being in fluid communication with the inner hollow passageway; and
- an adsorbent in a powder or crystalline powder form, the adsorbent being capable of selectively adsorbing one or more intended adsorptive constituents of the gas, the adsorbent being uniformly dispersed throughout the pores of the fiber member such that, as the gas is introduced within the inner hollow passageway of the fiber member, non-intended constituents of the gas pass through the interconnected pores of the fiber member so as to flow through an external area of the exterior surface of the fiber member, while the one or more intended adsorptive constituents of the gas are adsorbed by the uniformly dispersed adsorbent in the pores;

a vacuum pump; and a gas flow path switching means to connect the hollow fiber internal communication port of the first hollow fiber membrane module to a mixed gas supply device and the hollow fiber external communication port of the first hollow fiber membrane module to the outside and thus to connect the hollow fiber internal communication port and the hollow fiber external communication port of the second hollow fiber membrane module to the vacuum pump when an adsorption process proceeds in the first hollow fiber membrane module so that an adsorbent regeneration process proceeds in the second hollow fiber membrane module, and to connect the hollow fiber internal communication port and the hollow fiber external communication port of the first hollow fiber membrane module to the vacuum pump and thus to connect the hollow fiber internal communication port of the second hollow fiber membrane module to the mixed gas supply device and the hollow fiber external communication port of the second hollow fiber membrane module to the outside when an adsorbent regeneration process proceeds in the first hollow fiber membrane module so that an adsorption process proceeds in the second hollow fiber membrane module.

4. The gas adsorptive-adsorptive separation system according to claim 3, wherein the adsorbent is one or two or more fillers selected from zeolites, activated carbon or silica.

5. The gas adsorptive-adsorptive separation system according to claim 3, wherein the porous fiber material is one or two or more polymers selected from polypropylene, polyimides, polyphenylene sulfide, polysulfones, polyvinylidene fluoride (PVDF), celluloses, or polyvinyl chloride (PVC).

6. A gas adsorptive-desorptive separation system comprising:

a first hollow fiber membrane module including a plurality of a first group of adsorptive hollow fiber membranes inside a housing as an assembly and the housing provided with a hollow fiber external communication port through which a gas is injected into the outside of the first group of adsorptive hollow fiber membranes and a hollow fiber internal communication port through which the gas permeated through the adsorptive hollow fiber membrane is discharged;

a second hollow fiber membrane module including a plurality of a second group of the adsorptive hollow fiber membranes inside a housing as an assembly and the housing provided with a hollow fiber external communication port through which the gas is injected into the outside of the second group of adsorptive hollow fiber membranes and a hollow fiber internal communication port through which the gas permeated through the adsorptive hollow fiber membrane is discharged;

wherein each of the adsorptive hollow fiber membranes of the first and second hollow fiber membrane modules comprises:
- a fiber member of a porous fiber material with pores interconnected throughout the fiber material, said fiber member having a generally annular shape with an exterior surface forming an outer boundary of the fiber member and with an inner hollow passageway disposed within the fiber member, with the pores of the fiber member being in fluid communication with the inner hollow passageway; and
- an adsorbent in a powder or crystalline powder form, the adsorbent being capable of selectively adsorbing one or more intended adsorptive constituents of the gas, the adsorbent being uniformly dispersed throughout the pores of the fiber member such that, as the gas is introduced to an external area of the exterior surface of the fiber member, non-intended constituents of the gas pass through the interconnected pores of the fiber member so as to flow through the inner hollow passageway of the fiber member, while the one or more intended adsorptive constituents of the gas are adsorbed by the uniformly dispersed adsorbent in the pores;

a vacuum pump; and a gas flow path switching means to connect the hollow fiber external communication port of the first hollow fiber membrane module to a mixed gas supply device and the hollow fiber internal communication port of the first hollow fiber membrane module to the outside and thus to connect the hollow fiber internal communication port and the hollow fiber external communication port of the second hollow fiber membrane module to the vacuum pump when an adsorption process proceeds in the first hollow fiber membrane module so that an adsorbent regeneration process proceeds in the second hollow fiber membrane module, and to connect the hollow fiber internal communication port and the hollow fiber external communication port of the first hollow fiber membrane module to the vacuum pump and thus to connect the hollow fiber external communication port of the second hollow fiber membrane module to the mixed gas supply device and the hollow fiber internal communication port of the second hollow fiber membrane module to the outside when an adsorbent regeneration process proceeds in the first hollow fiber membrane module so that an adsorption process proceeds in the second hollow fiber membrane module.

7. The gas adsorptive-adsorptive separation system according to claim 6, wherein the adsorbent is one or two or more fillers selected from zeolites, activated carbon or silica.

8. The gas adsorptive-adsorptive separation system according to claim 6, wherein the porous fiber material is one or two or more polymers selected from polypropylene, polyimides, polyphenylene sulfide, polysulfones, polyvinylidene fluoride (PVDF), celluloses, or polyvinyl chloride (PVC).

\* \* \* \* \*

UNITED STATES PATENT AND TRADEMARK OFFICE
CERTIFICATE OF CORRECTION

| | | |
|---|---|---|
| PATENT NO. | : 9,446,349 B2 | Page 1 of 2 |
| APPLICATION NO. | : 14/734439 | |
| DATED | : September 20, 2016 | |
| INVENTOR(S) | : Yeom et al. | |

It is certified that error appears in the above-identified patent and that said Letters Patent is hereby corrected as shown below:

In the Claims

Column 14, Line 49, In Claim 3, replace the claim with the following:

A gas adsorptive-desorptive separation system comprising:
    a first hollow fiber membrane module including a plurality of a first group of adsorptive hollow fiber membranes inside a housing as an assembly and the housing provided with a hollow fiber internal communication port through which a gas is injected into the inside of the first group of adsorptive hollow fiber membranes and a hollow fiber external communication port through which the gas permeated through the adsorptive hollow fiber membranes is discharged;
    a second hollow fiber membrane module including a plurality of a second group of adsorptive hollow fiber membranes inside a housing as an assembly and the housing provided with a hollow fiber internal communication port through which the gas is injected into the inside of the second group of adsorptive hollow fiber membranes and a hollow fiber external communication port through which the gas permeated through the adsorptive hollow fiber membrane is discharged;
    wherein each of the adsorptive hollow fiber membranes of the first and second hollow fiber membrane modules comprises:
        a fiber member of a porous fiber material with pores interconnected throughout the fiber material, said fiber member having a generally annular shape with an exterior surface forming an outer boundary of the fiber member and with an inner hollow passageway disposed within the fiber member, with the pores of the fiber member being in fluid communication with the inner hollow passageway; and
        an adsorbent in a powder or crystalline powder form, the adsorbent being capable of selectively adsorbing one or more intended adsorptive constituents of the gas, the adsorbent being uniformly dispersed throughout the pores of the Signed and Sealed this
Twenty-first Day of February, 2017

Michelle K. Lee
*Director of the United States Patent and Trademark Office* fiber member such that, as the gas is introduced within the inner hollow passageway of the fiber member, non-intended constituents of the gas pass through the interconnected pores of the fiber member so as to flow through an external area of the exterior surface of the fiber member, while the one or more intended adsorptive constituents of the gas are adsorbed by the uniformly dispersed adsorbent in the pores;

a vacuum pump; and a gas flow path switching means to connect the hollow fiber internal communication port of the first hollow fiber membrane module to a mixed gas supply device and the hollow fiber external communication port of the first hollow fiber membrane module to the outside and thus to connect the hollow fiber internal communication port and the hollow fiber external communication port of the second hollow fiber membrane module to the vacuum pump when an adsorption process proceeds in the first hollow fiber membrane module so that an adsorbent regeneration process proceeds in the second hollow fiber membrane module, and to connect the hollow fiber internal communication port and the hollow fiber external communication port of the first hollow fiber membrane module to the vacuum pump and thus to connect the hollow fiber internal communication port of the second hollow fiber membrane module to the mixed gas supply device and the hollow fiber external communication port of the second hollow fiber membrane module to the outside when an adsorbent regeneration process proceeds in the first hollow fiber membrane module so that an adsorption process proceeds in the second hollow fiber membrane module.